US012655903B2

(12) United States Patent (10) Patent No.: US 12,655,903 B2
Wakui et al. (45) Date of Patent: Jun. 16, 2026

(54) POWER TRANSMISSION DEVICE

(71) Applicant: HONDA MOTOR CO., LTD., Tokyo (JP)

(72) Inventors: Takashi Wakui, Saitama (JP); Motoshi Togasaki, Saitama (JP); Masahiro Imai, Saitama (JP); Kazuki Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 18/796,852

(22) Filed: Aug. 7, 2024

(65) Prior Publication Data

US 2025/0052315 A1 Feb. 13, 2025

(30) Foreign Application Priority Data

Aug. 7, 2023 (JP) .................................. 2023-128833

(51) Int. Cl.
F16H 57/04 (2010.01)
(52) U.S. Cl.
CPC ....... F16H 57/0479 (2013.01); F16H 57/043 (2013.01); F16H 57/045 (2013.01); F16H 57/0483 (2013.01)
(58) Field of Classification Search
CPC .. F16H 57/0479; F16H 57/043; F16H 57/045; F16H 57/0483; F16H 57/0417; F16H 57/0435; F16H 57/0476; F16H 57/0423; F16H 57/0424; F16H 57/0457; F16H 57/0471; F16H 57/0436; F16H 57/023; F16H 57/0413; F16H 57/08; F16H 48/08;

F16H 48/06; F16H 2001/2881; B60K 2001/003; B60K 2001/001; B60K 11/02; B60K 17/16; B60Y 2306/03; B60Y 2400/61
See application file for complete search history.

(56) References Cited

U.S. PATENT DOCUMENTS

2004/0154846 A1    8/2004  Kira
2011/0230292 A1*   9/2011  Komatsu ................ B60K 6/445
                                                                  475/5

(Continued)

FOREIGN PATENT DOCUMENTS

EP           2546551 A2 *   1/2013    ......... F16H 57/0471
JP      2004-180477 A    6/2004

*Primary Examiner* — Farhana Pervin
(74) *Attorney, Agent, or Firm* — Paratus Law Group, PLLC

(57) ABSTRACT

A power transmission device includes: a deceleration device; and a case including a gear chamber provided with an accommodation chamber that accommodates the deceleration device therein, in which the deceleration device includes an input shaft whose rotation axis direction extends in a horizontal direction, and a deceleration mechanism configured to reduce power input from the input shaft, and a wall portion of the case is provided with a first storage portion configured to store a lubricating liquid for lubricating the deceleration device, the first storage portion being arranged above a rotation axis of the input shaft and below an upper end of the deceleration mechanism in an upper-lower direction, and arranged at a position where at least a part thereof overlaps the deceleration mechanism in an axial direction of the input shaft.

24 Claims, 21 Drawing Sheets

(56)        References Cited

U.S. PATENT DOCUMENTS

| | | | |
|---|---|---|---|
| 2013/0153338 A1* | 6/2013 | Yamauchi | H02K 9/19 |
| | | | 184/26 |
| 2015/0204436 A1* | 7/2015 | Mafune | F16H 57/0409 |
| | | | 475/160 |
| 2016/0123454 A1* | 5/2016 | Tahara | F16H 57/045 |
| | | | 74/467 |
| 2016/0290480 A1* | 10/2016 | Sada | F16H 57/0447 |
| 2018/0363762 A1* | 12/2018 | Kiyokami | F16H 57/0441 |
| 2020/0025284 A1* | 1/2020 | Sadahiro | F16H 48/285 |
| 2022/0282783 A1* | 9/2022 | Nakata | F16H 57/0423 |
| 2023/0003289 A1* | 1/2023 | Gowrisankar | B60K 17/04 |
| 2023/0078446 A1* | 3/2023 | Wechs | B60K 17/08 |
| | | | 475/5 |
| 2025/0102051 A1* | 3/2025 | Hirota | F16H 48/08 |

* cited by examiner

*FIG. 5*

(FRONT)

(REAR)

(TOP VIEW)

(LEFT SIDE VIEW)

POWER TRANSMISSION DEVICE

CROSS-REFERENCE TO RELATED APPLICATIONS

This application is based on and claims priority under 35 USC 119 from Japanese Patent Application No. 2023-128833 filed on Aug. 7, 2023, the entire content of which is incorporated herein by reference.

TECHNICAL FIELD

The present invention relates to a power transmission device mounted on an electric vehicle or the like.

BACKGROUND ART

In recent years, efforts to realize a low-carbon society or a decarbonized society become active, and research and development about an electrification technique are conducted to reduce $CO_2$ emission and improve energy efficiency in vehicles.

In the electrification technique for vehicles, to have a higher degree of freedom of mounting onto vehicles, a power transmission device is required to be downsized, and is particularly required to be reduced in size in a height direction. In addition, to reduce electric energy consumption and increase a cruising distance, efficient power transmission is required.

For example, JP2004-180477A discloses a power transmission device that improves lubrication performance by forming a space for storing lubricating oil in a case.

However, in the power transmission device disclosed in JP2004-180477A, since the space for storing the lubricating oil is formed above a drive gear provided on a main shaft of a speed reducer, a dimension in a height direction of the power transmission device is increased.

An object of the present invention is to provide a power transmission device whose dimension in a height direction can be reduced without lowering power transmission efficiency.

SUMMARY OF INVENTION

According to an aspect of the present invention, there is provided a power transmission device including:
    a deceleration device; and
    a case including a gear chamber provided with an accommodation chamber that accommodates the deceleration device therein, in which
    the deceleration device includes
        an input shaft whose rotation axis direction extends in a horizontal direction, and
        a deceleration mechanism configured to reduce power input from the input shaft, and
    a wall portion of the case is provided with a first storage portion configured to store a lubricating liquid for lubricating the deceleration device, the first storage portion being arranged above a rotation axis of the input shaft and below an upper end of the deceleration mechanism in an upper-lower direction, and arranged at a position where at least a part thereof overlaps the deceleration mechanism in an axial direction of the input shaft.

According to another aspect of the present invention, there is provided a power transmission device including:
    a differential gear mechanism; and a case including a gear chamber provided with an accommodation chamber that accommodates the differential gear mechanism therein, in which
    the differential gear mechanism includes
        a differential case whose rotation axis direction extends in a horizontal direction, and
    a wall portion of the case is provided with a second storage portion configured to store a lubricating liquid for lubricating the differential gear mechanism, the second storage portion being arranged above a rotation axis of the differential case and below an upper end of the differential case in an upper-lower direction, and arranged at a position where at least a part thereof overlaps the differential gear mechanism in an axial direction of the differential case.

BRIEF DESCRIPTION OF DRAWINGS

Figure 5:
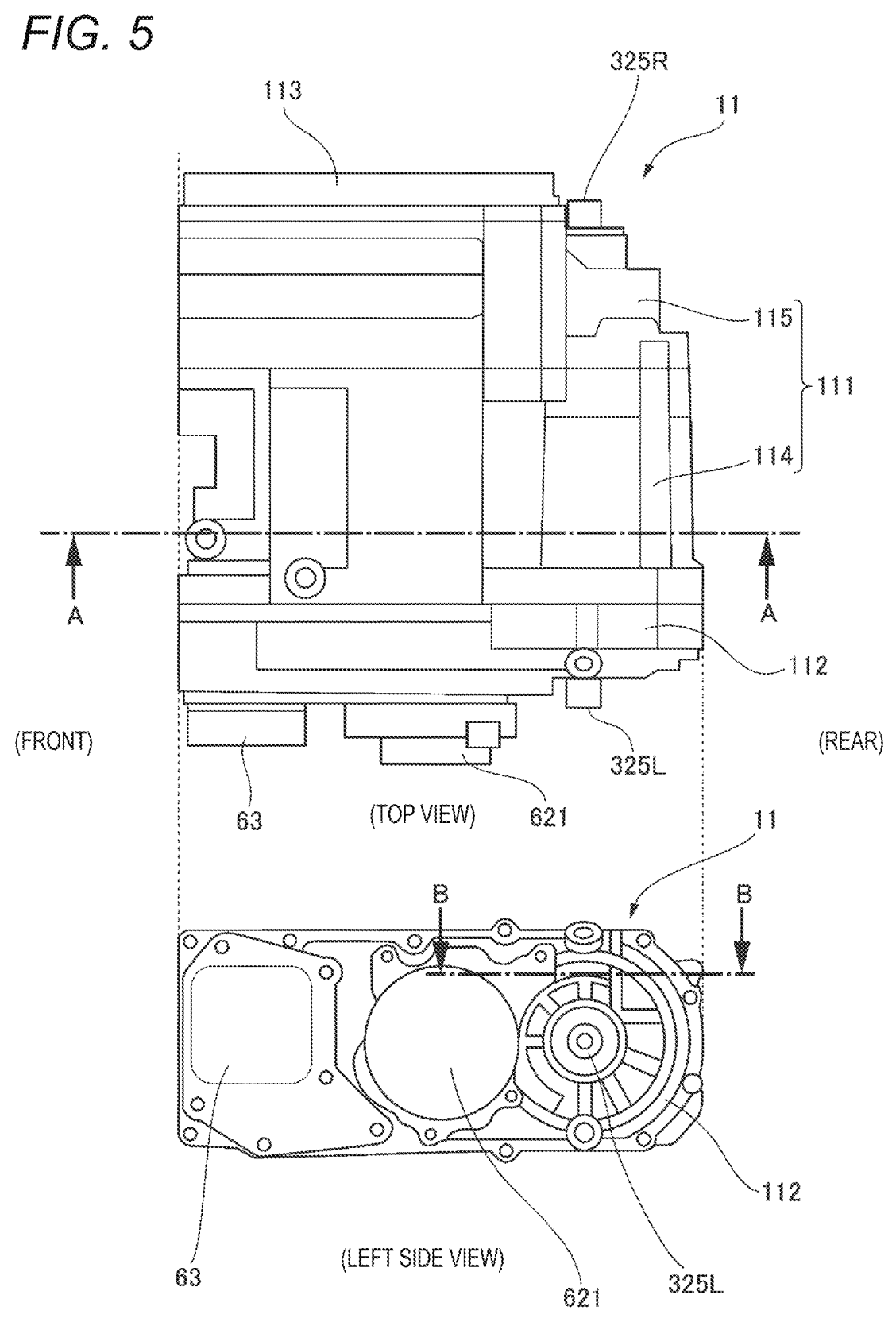

FIG. 5 is a top view and a left side view of the drive unit in FIG. 2.

DESCRIPTION OF EMBODIMENTS

Figure 1:
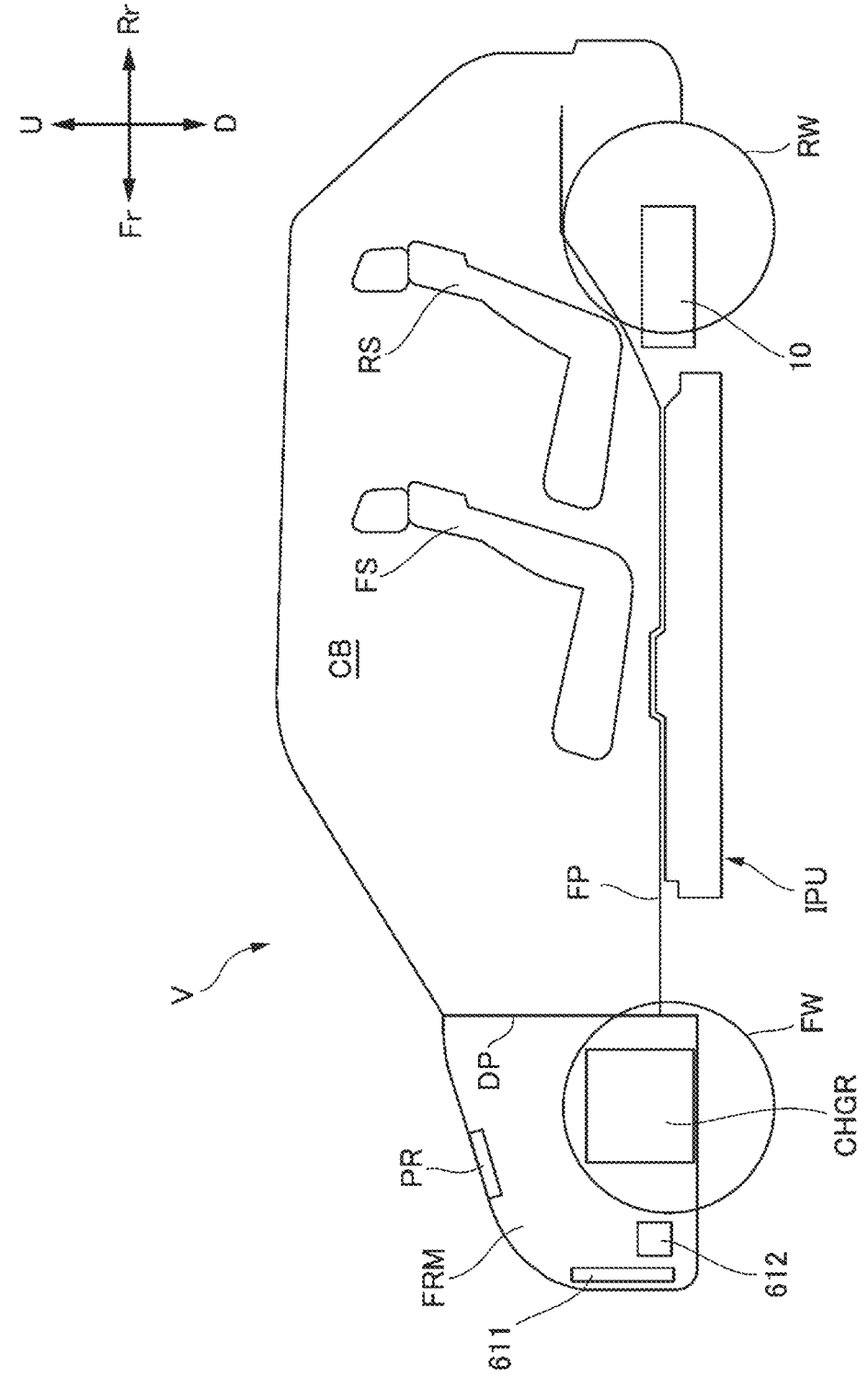
FIG. 1 is a schematic view of a vehicle on which a drive unit according to an embodiment of the present invention is mounted when viewed from a left side.

Hereinafter, a vehicle on which a drive unit that is an embodiment of a power transmission device of the present invention is mounted will be described with reference to the accompanying drawings. The drawings are viewed in directions of reference numerals. In the present specification and the like, in order to simplify and clarify the description, a front-rear direction, a left-right direction, and an upper-lower direction are described according to directions viewed from a driver of a vehicle. In the drawings, a front side of the vehicle is shown as Fr, a rear side is shown as Rr, a left side is shown as L, a right side is shown as R, an upper side is shown as U, and a lower side is shown as D.

[Overall Configuration of Vehicle]

As shown in FIG. 1, a vehicle V according to the present embodiment includes a pair of left and right front wheels FW, a pair of left and right rear wheels RW, and a floor panel FP constituting a floor of the vehicle V. The vehicle V is partitioned, by a dash panel DP extending in the upper-lower direction above the floor panel FP, into a passenger compartment CB and a front room FRM in front of the passenger compartment CB. A front seat FS and a rear seat RS are provided in the passenger compartment CB.

The vehicle V includes a drive unit 10 serving as a drive source, a battery pack IPU for storing electric power to be supplied to the drive unit 10, a charge and power supply control device CHGR for controlling input and output electric power of the battery pack IPU, a power-receiving portion PR capable of receiving electric power from an external power supply, a radiator 611 through which cooling water R1 for cooling a control device 50 to be described later of the drive unit 10 flows, and a cooling water pump 612 for pumping the cooling water R1. The cooling water R1 is, for example, cooling water called a long life coolant (LLC).

The drive unit 10 is disposed behind the rear seats RS and below the floor panel FP. The battery pack IPU is disposed below the floor panel FP and below a floor of the passenger compartment CB. The battery pack IPU accommodates a plurality of battery modules in which a plurality of battery cells are stacked. Each battery cell is a secondary battery that can be charged and discharged, such as a lithium ion battery or an all-solid-state battery.

The charge and power supply control device CHGR is accommodated in the front room FRM. The power-receiving portion PR is provided on an upper surface of the front room FRM and is electrically connected to the charge and power supply control device CHGR. The radiator 611 is accommodated in the front room FRM, and is disposed in the vicinity of a front end in the front room FRM. The radiator 611 is a heat exchanger for cooling the cooling water R1 by heat exchange between the flowing cooling water R1 and external air due to driving wind of the vehicle V. The cooling water pump 612 is accommodated in the front room FRM.

[Overall Configuration of Drive Unit]

Figure 2:
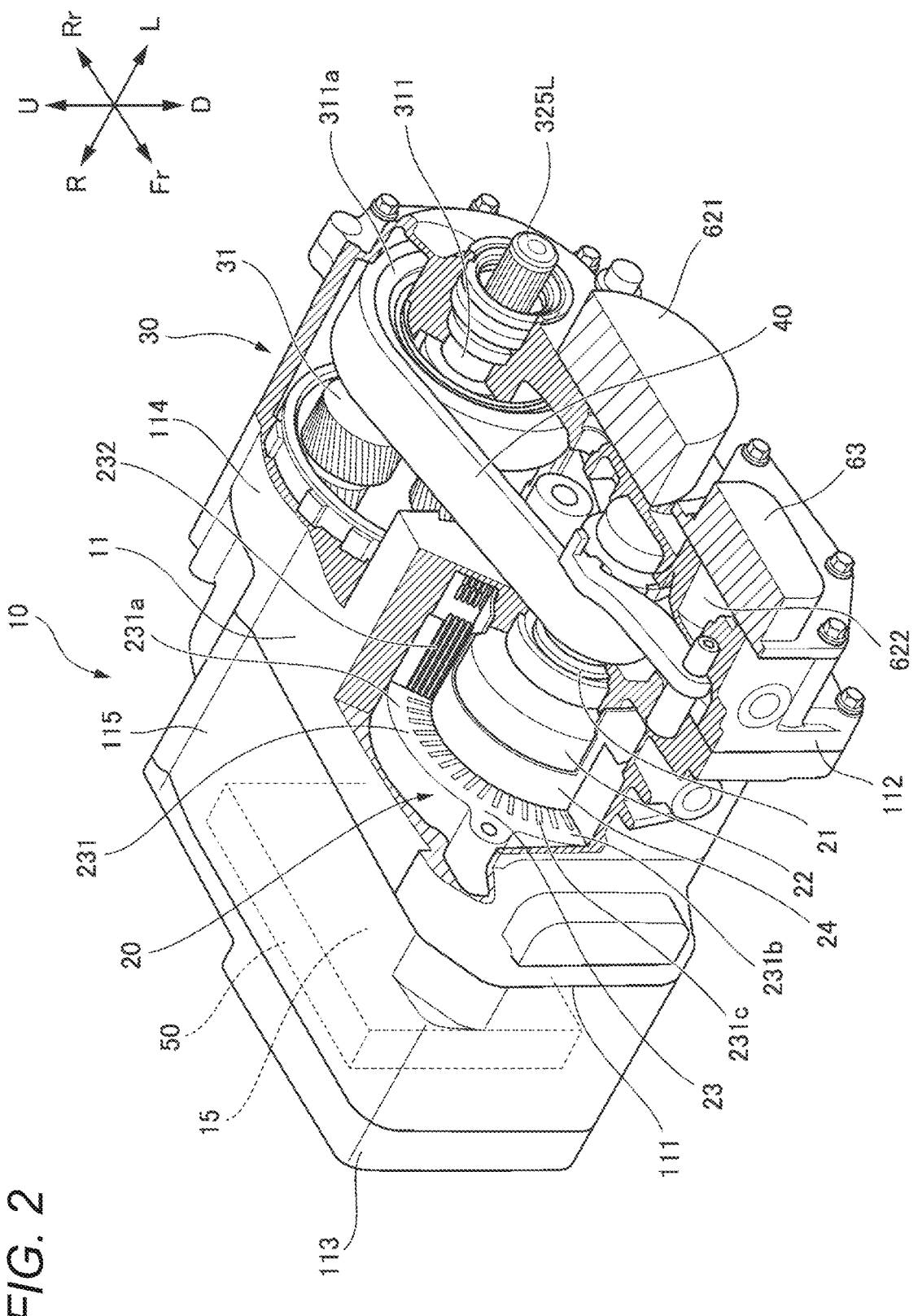
FIG. 2 is a perspective view in which a part of the drive unit of the embodiment of the present invention is cut.
Figure 3:
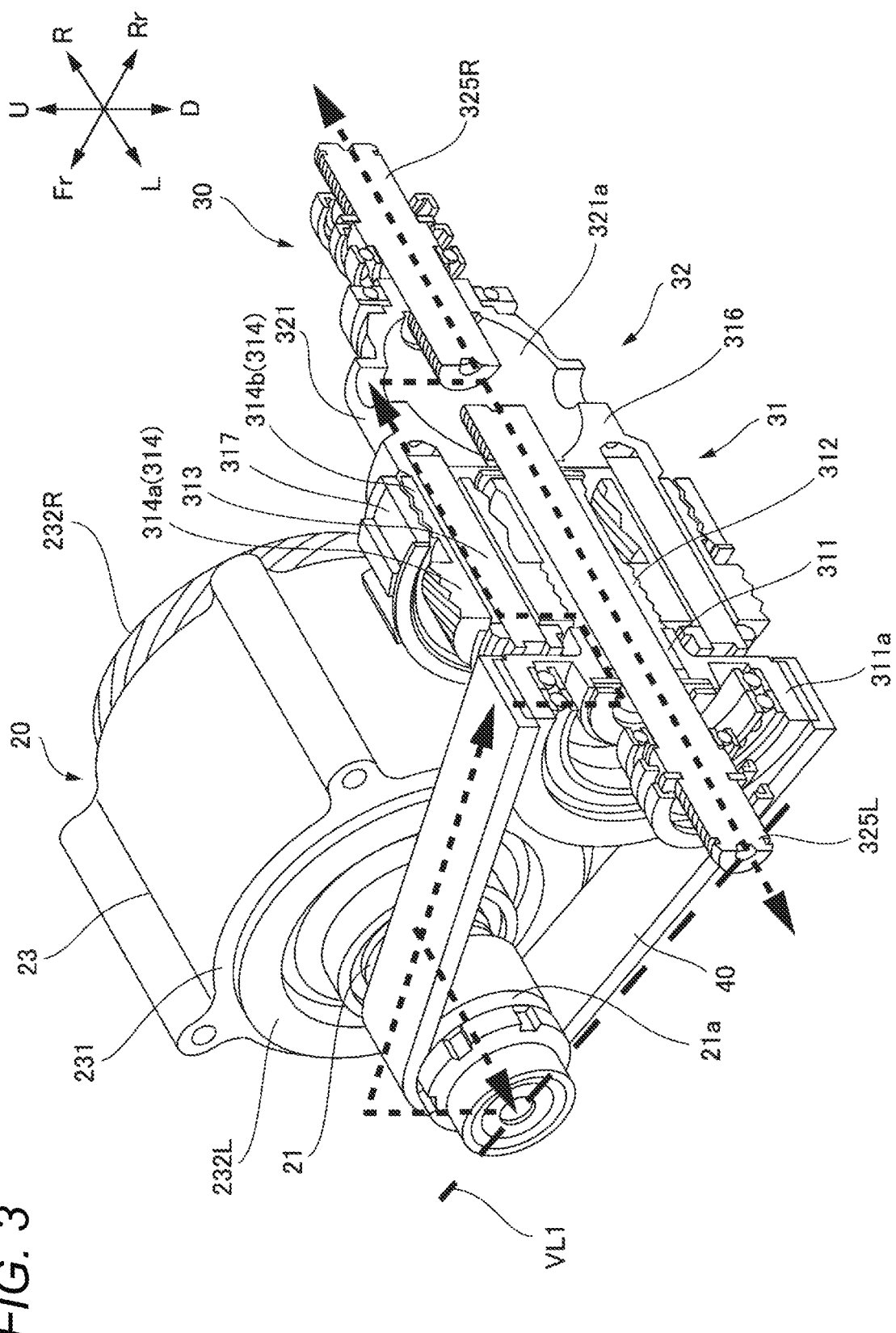
FIG. 3 is a partial cross-sectional perspective view showing a power transmission path in the drive unit in FIG. 2.

As shown in FIGS. 2 and 3, the drive unit 10 includes a drive motor 20, a deceleration device 30 that reduces power output from the drive motor 20 and outputs the reduced power to the outside, a power transmission chain 40 for transmitting the power output from the drive motor 20 to the deceleration device 30, the control device 50 for controlling the drive motor 20, an oil pump 621 for pumping a motor cooling oil R2, and an oil cooler 63 for performing heat exchange between the cooling water R1 and the motor cooling oil R2. The motor cooling oil R2 is, for example, an oil called an automatic transmission fluid (ATF).

In the drive unit 10, the drive motor 20, the deceleration device 30, the power transmission chain 40, and the control device 50 are accommodated in a drive unit case 11. The oil pump 621 and the oil cooler 63 are attached to a left side surface of the drive unit case 11.

The drive motor 20 is a so-called inner rotor motor that includes a drive shaft 21, a rotor 22 that is attached to the drive shaft 21 and rotates integrally with the drive shaft 21, and a stator 23 that is disposed on a radial direction outer side of the rotor 22 in a manner of facing the rotor 22 in the radial direction with a slight gap therebetween.

In the present embodiment, in the drive unit 10, the drive motor 20 is disposed such that an axial direction (that is, the drive shaft 21) is horizontally oriented in the left-right direction. In this way, since the drive shaft 21 is oriented in the horizontal direction, an upper-lower dimension of the drive unit 10 can be compact.

The stator 23 includes a stator core 231 and a coil 232 that is attached to the stator core 231 and includes a plurality of windings of a U-phase, a V-phase, and a W-phase.

The stator core 231 is formed by stacking, in the axial direction, a plurality of thin plate-shaped electromagnetic steel sheets each having a substantially annular shape.

The stator core 231 includes a yoke portion 231a having a substantially annular shape that forms an outer ring portion of the stator core 231 when viewed in the axial direction, and a plurality of teeth portions 231b that protrude in the radial direction from an inner peripheral surface of the yoke portion 231a toward a center. The plurality of teeth portions 231b are disposed at equal intervals along a circumferential direction of the stator core 231 when viewed in the axial direction. A slot portion 231c is formed between the teeth portions 231b adjacent in the circumferential direction of the stator core 231. A plurality of slot portions 231c are formed at equal intervals along the circumferential direction of the stator core 231. The teeth portions 231b and the slot portions 231c extend along the axial direction of the stator core 231.

The coil 232 includes a plurality of conductor segments inserted into the slot portions 231c of the stator core 231. The conductor segments are inserted into all of the plurality of slot portions 231c formed along the circumferential direction of the stator core 231.

The coil 232 includes a left coil end 232L that protrudes outward in the axial direction from a left end surface on one side in the axial direction of the stator core 231, and a right coil end 232R that protrudes outward in the axial direction from a right end surface on the other side in the axial direction of the stator core 231.

A drive sprocket 21a around which the power transmission chain 40 is wound is attached to a left end of the drive shaft 21. The drive sprocket 21a rotates integrally with the drive shaft 21.

Figure 4:
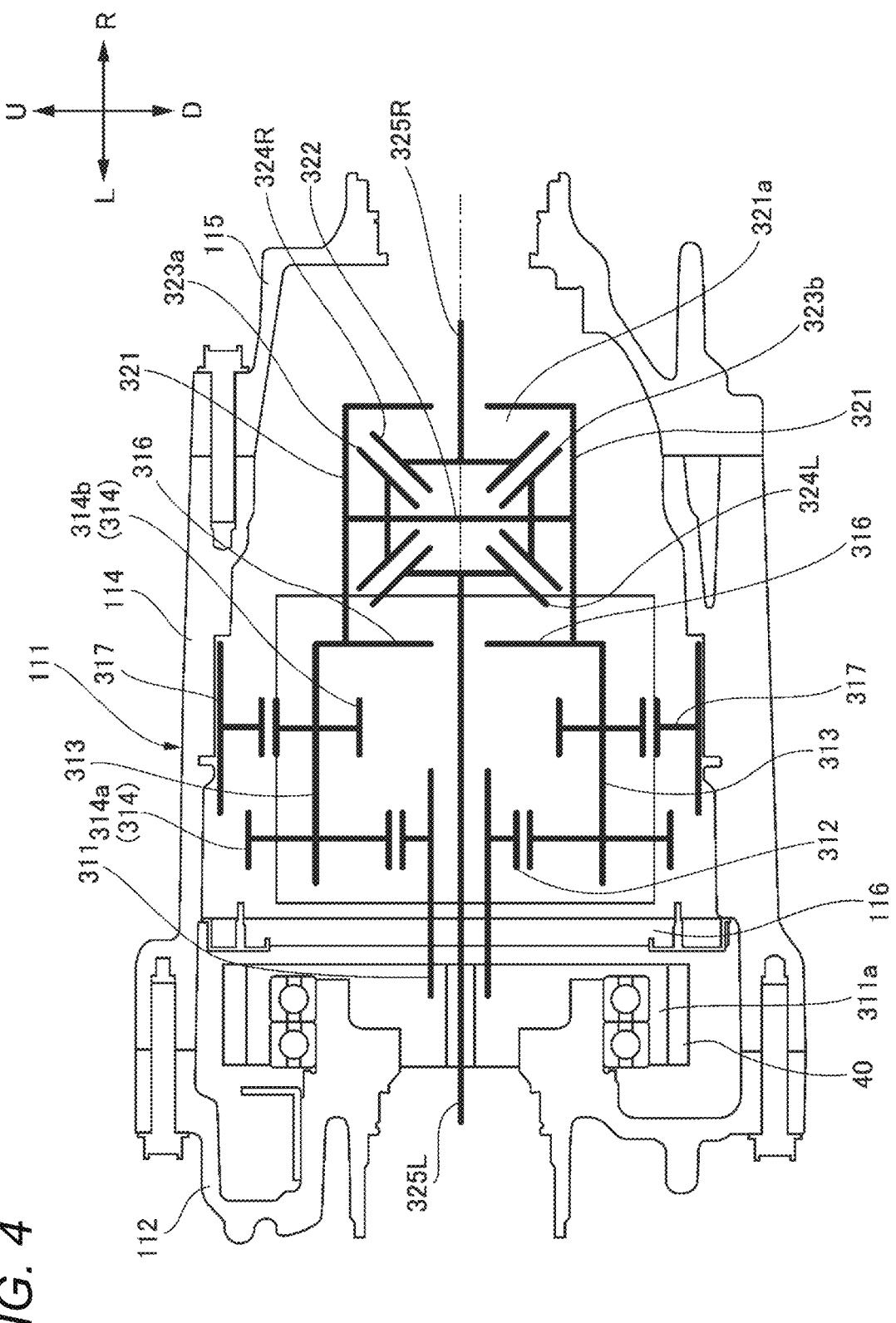
FIG. 4 is a skeleton diagram of a deceleration device in the drive unit in FIG. 2.

As shown in FIGS. 3 and 4, the deceleration device 30 includes a planetary gear mechanism 31 and a differential gear mechanism 32.

First, the planetary gear mechanism 31 will be described.

The planetary gear mechanism 31 includes an input shaft 311, a sun gear 312, a plurality of planetary pinion shafts 313, the same number of stepped pinions 314 as the planetary pinion shafts 313, a planetary carrier 316, and a ring gear 317.

In the present embodiment, the planetary gear mechanism 31 is aligned behind the drive motor 20 in the front-rear direction. The planetary gear mechanism 31 is disposed such that an axial direction (that is, the input shaft 311) is parallel to the axial direction of the drive motor 20 and is oriented in the left-right direction. The input shaft 311 of the planetary gear mechanism 31 is disposed at substantially the same height as the drive shaft 21 of the drive motor 20 in the upper-lower direction. Further, an outer diameter dimension of the planetary gear mechanism 31 is substantially the same dimension as an outer diameter dimension of the drive motor 20, and a height of the drive unit 10 is small in the upper-lower direction.

The input shaft 311 is a hollow shaft into which a left drive shaft to be described later is inserted. A driven sprocket 311*a* around which the power transmission chain 40 is wound is attached to a left end of the input shaft 311. The driven sprocket 311*a* rotates integrally with the input shaft 311. The driven sprocket 311*a* has a larger diameter than the drive sprocket 21*a* attached to the drive shaft 21 of the drive motor 20, and the number of teeth of the driven sprocket 311*a* is larger than the number of teeth of the drive sprocket 21*a*.

The sun gear 312 is an external gear provided on the input shaft 311, and rotates integrally with the input shaft 311 about the same rotation axis.

The plurality of planetary pinion shafts 313 are disposed at equal intervals in a circumferential direction along an outer peripheral surface of the sun gear 312 in a manner of being oriented in the left-right direction parallel to the input shaft 311 on a radial direction outer side of the sun gear 312. In the present embodiment, four planetary pinion shafts 313 are disposed on the radial direction outer side of the sun gear 312 at intervals of 90 degrees in the circumferential direction along the circumferential direction of the input shaft 311.

The stepped pinion 314 including a first planetary gear 314*a* and a second planetary gear 314*b* that rotate integrally is pivotally supported by each planetary pinion shaft 313 in a freely rotatable manner. In the present embodiment, on each planetary pinion shaft 313, the first planetary gear 314*a* is disposed on the left side and the second planetary gear 314*b* is disposed on the right side. Therefore, four first planetary gears 314*a* and four second planetary gears 314*b* are disposed in an annular shape at intervals of 90 degrees along the circumferential direction of the input shaft 311.

Each first planetary gear 314*a* is an external gear that is disposed on the outer peripheral surface of the sun gear 312 and meshes with the sun gear 312. The four first planetary gears 314*a* are provided in an annular shape at intervals of 90 degrees along the outer peripheral surface of the sun gear 312. The four first planetary gears 314*a* mesh with the outer peripheral surface of the sun gear 312.

Each second planetary gear 314*b* is an external gear that is disposed on an inner peripheral surface of the ring gear 317 and meshes with the ring gear 317. The four second planetary gears 314*b* are provided in an annular shape at intervals of 90 degrees along the inner peripheral surface of the ring gear 317. In the present embodiment, each second planetary gear 314*b* is an external gear having a smaller diameter than the first planetary gear 314*a*.

The planetary carrier 316 connects the four planetary pinion shafts 313. The planetary carrier 316 is rotatable about a rotation axis coaxial with the input shaft 311 (and the sun gear 312) integrally with the four planetary pinion shafts 313.

Therefore, the stepped pinion 314 including the first planetary gear 314*a* and the second planetary gear 314*b* is freely rotatable about the planetary pinion shaft 313 as an axis, and is freely revolvable about the rotation axis coaxial with the input shaft 311 (and the sun gear 312) integrally with the planetary pinion shaft 313. The planetary carrier 316 rotates integrally with a revolutionary motion of the stepped pinion 314 on the rotation axis coaxial with the input shaft 311 (and the sun gear 312).

The ring gear 317 is an annular internal gear that surrounds the four second planetary gears 314*b* disposed in an annular shape and whose inner peripheral surface meshes with the second planetary gears 314*b*. In the present embodiment, the ring gear 317 is fixed to the drive unit case 11, and the ring gear 317 does not rotate.

Next, the differential gear mechanism 32 will be described.

The differential gear mechanism 32 includes a differential case 321, a differential pinion shaft 322 supported by the differential case 321, a first bevel gear 323*a* and a second bevel gear 323*b* pivotally supported by the differential pinion shaft 322 in a freely pivotable manner, a left side gear 324L and a right side gear 324R meshing with the first bevel gear 323*a* and the second bevel gear 323*b*, and a left drive shaft 325L and a right drive shaft 325R.

The differential case 321 is formed integrally with the planetary carrier 316 of the planetary gear mechanism 31. Therefore, the differential case 321 rotates about the rotation axis coaxial with the input shaft 311 integrally with planetary carrier 316 of the planetary gear mechanism 31. The differential case 321 includes an accommodating portion 321*a* that accommodates the differential pinion shaft 322, the first bevel gear 323*a*, the second bevel gear 323*b*, the left side gear 324L, and the right side gear 324R.

The differential pinion shaft 322 is accommodated in the accommodating portion 321*a* of the differential case 321 and is supported by the differential case 321. The differential pinion shaft 322 is disposed in the accommodating portion 321*a* of the differential case 321 in a manner of being orthogonal to the rotation axis of the differential case 321. The differential pinion shaft 322 rotates integrally with the differential case 321 about the rotation axis of the differential case 321.

The first bevel gear 323*a* is accommodated in the accommodating portion 321*a* of the differential case 321 and is pivotally supported by the differential pinion shaft 322 in a freely rotatable manner. The first bevel gear 323*a* has a substantially truncated conical shape whose upper surface is oriented toward the rotation axis of the differential case 321, and a gear is formed on a side surface of the truncated cone.

The second bevel gear 323*b* is accommodated in the accommodating portion 321*a* of the differential case 321 and is pivotally supported by the differential pinion shaft 322 in a freely rotatable manner of facing the first bevel gear 323*a*. The second bevel gear 323*b* has a substantially truncated conical shape whose upper surface is oriented toward the rotation axis of the differential case 321, and a gear is formed on a side surface of the truncated cone.

The left side gear 324L is accommodated in the accommodating portion 321*a* of the differential case 321, and is disposed between the first bevel gear 323*a* and the second bevel gear 323*b* on the left side of the differential pinion shaft 322. A rotation axis of the left side gear 324L is coaxial with the rotation axis of the differential case 321. The left side gear 324L has a substantially truncated conical shape whose upper surface is oriented toward the differential pinion shaft 322 (that is, rightward), and a gear is formed on a side surface of the truncated cone. The left side gear 324L meshes with both the first bevel gear 323*a* and the second bevel gear 323*b*.

The right side gear 324R is accommodated in the accommodating portion 321*a* of the differential case 321, and is disposed between the first bevel gear 323*a* and the second bevel gear 323*b* on the right side of the differential pinion shaft 322 in a manner of facing the left side gear 324L in the left-right direction with the differential pinion shaft 322 interposed therebetween. A rotation axis of the right side gear 324R is coaxial with the rotation axis of the differential case 321 and the rotation axis of the left side gear 324L. The right side gear 324R has a substantially truncated conical shape whose upper surface is oriented toward the differential pinion shaft 322 (that is, leftward), and a gear is formed on a side surface of the truncated cone. The right side gear 324R meshes with both the first bevel gear 323a and the second bevel gear 323b.

The left drive shaft 325L is inserted through a hollow portion of the input shaft 311 of the planetary gear mechanism 31 and a center of the driven sprocket 311a, and extends in the left-right direction coaxially with the rotation axis of the input shaft 311 of the planetary gear mechanism 31 and the rotation axis of the differential case 321. The left side gear 324L is attached to a right end of the left drive shaft 325L, and the left rear wheel RW is attached to a left end of the left drive shaft 325L. Therefore, the left side gear 324L, the left drive shaft 325L, and the left rear wheel RW rotate integrally.

The right drive shaft 325R extends in the left-right direction coaxially with the rotation axis of the input shaft 311 of the planetary gear mechanism 31, the rotation axis of the differential case 321, and the rotation axis of the left drive shaft 325L. The right side gear 324R is attached to a left end of the right drive shaft 325R, and the right rear wheel RW is attached to a right end of the right drive shaft 325R. Therefore, the right side gear 324R, the right drive shaft 325R, and the right rear wheel RW rotate integrally.

In this way, since the differential case 321 is formed integrally with the planetary carrier 316 of the planetary gear mechanism 31, the planetary gear mechanism 31 and the differential gear mechanism 32 can be integrated, and the deceleration device 30 can be further downsized.

Next, a power transmission path of power output from the drive motor 20 will be described.

Power generated by the drive motor 20 is output from the drive shaft 21, and the drive sprocket 21a attached to the drive shaft 21 rotates integrally with the drive shaft 21. When the drive sprocket 21a rotates, the driven sprocket 311a rotates due to the power transmission chain 40 wound around the drive sprocket 21a and the driven sprocket 311a attached to the input shaft 311 of the planetary gear mechanism 31. The input shaft 311 of the planetary gear mechanism 31 rotates integrally with the driven sprocket 311a. At this time, since the number of teeth of the driven sprocket 311a is larger than the number of teeth of the drive sprocket 21a, the rotation of the drive shaft 21 is reduced via the drive sprocket 21a, the power transmission chain 40, and the driven sprocket 311a, and is input to the input shaft 311 of the planetary gear mechanism 31.

In the planetary gear mechanism 31, the power input to the input shaft 311 is transmitted to the stepped pinion 314 via the sun gear 312. The stepped pinion 314 rotates while revolving. The planetary carrier 316 rotates integrally with the revolution of the stepped pinion 314. In the planetary gear mechanism 31, since the ring gear 317 is fixed, the rotation of the input shaft 311 is reduced at a predetermined reduction ratio and transmitted to the planetary carrier 316.

In the differential gear mechanism 32, the differential case 321 is formed integrally with the planetary carrier 316 of the planetary gear mechanism 31, and thus rotates integrally with the rotation of the planetary carrier 316. Therefore, the power input to the input shaft 311 of the planetary gear mechanism 31 is reduced at the predetermined reduction ratio and input to the differential case 321 via the planetary carrier 316.

Therefore, the power output from the drive shaft 21 is input to the differential case 321 of the differential gear mechanism 32 via the power transmission chain 40 and the planetary gear mechanism 31, and the differential pinion shaft 322 revolves about the rotation axis of the differential case 321 together with the differential case 321.

When the vehicle V travels straight, there is no rotation difference between the left and right rear wheels RW, and thus the left side gear 324L and the right side gear 324R that mesh with the first bevel gear 323a and the second bevel gear 323b rotate according to rotation of the differential pinion shaft 322. The left rear wheel RW rotates when the left drive shaft 325L rotates integrally with the rotation of the left side gear 324L, and the right rear wheel RW rotates when the right drive shaft 325R rotates integrally with the rotation of the right side gear 324R.

When the vehicle V turns, the differential pinion shaft 322 revolves, the first bevel gear 323a and the second bevel gear 323b rotate such that a rotation speed of the rear wheel RW on an inner side during turning decreases whereas a rotation speed of the rear wheel RW on an outer side during turning increases, and meanwhile, the left side gear 324L and the right side gear 324R that mesh with the first bevel gear 323a and the second bevel gear 323b rotate at different rotation speeds such that the rotation speed of the rear wheel RW on the inner side during turning decreases whereas the rotation speed of the rear wheel RW on the outer side during turning increases. The left rear wheel RW rotates when the left drive shaft 325L rotates integrally with the rotation of the left side gear 324L, and the right rear wheel RW rotates when the right drive shaft 325R rotates integrally with the rotation of the right side gear 324R. Therefore, when the vehicle V turns, the left drive shaft 325L and the right drive shaft 325R rotate such that the rotation speed of the rear wheel RW on the inner side during turning decreases whereas the rotation speed of the rear wheel RW on the outer side during turning increases.

In this way, as indicated by arrows in FIG. 3, the power output from the drive motor 20 is reduced via the drive sprocket 21a, the driven sprocket 311a, and the power transmission chain 40, then is input to the deceleration device 30, is further reduced by the planetary gear mechanism 31, and the power is appropriately distributed and transmitted to the left and right rear wheels RW by the differential gear mechanism 32.

By using the planetary gear mechanism 31 in a deceleration mechanism, it is possible to obtain a desired reduction ratio while limiting an increase in a dimension in the radial direction relative to the rotation axis direction.

Next, the drive unit case 11 will be described with reference to FIGS. 5 to 10.

The drive unit case 11 includes a main case 111, a left side cover 112 covering a left side surface of the main case 111, and a right side cover 113 covering a right side surface of the main case 111. The main case 111 is divided into two portions, left and right, that is, a left main case 114 and a right main case 115.

The main case 111 is divided into a motor chamber 12 that accommodates the drive motor 20, a gear chamber 13 that accommodates the deceleration device 30, a chain chamber 14 that accommodates the power transmission chain 40, and a controller chamber 15 that accommodates the control device 50. The motor chamber 12 and the gear chamber 13 are formed side by side in the front-rear direction such that the motor chamber 12 is located on the front side and the gear chamber 13 is located on the rear side. The chain chamber 14 is formed on the left side of the motor chamber 12 and the gear chamber 13, and is open leftward. The controller chamber 15 is formed on the right side of the motor chamber 12 and the gear chamber 13, and is open rightward.

The left side cover 112 covers a left opening of the chain chamber 14. The oil pump 621 and the oil cooler 63 are fixed to a left side surface of the left side cover 112.

Figure 6:
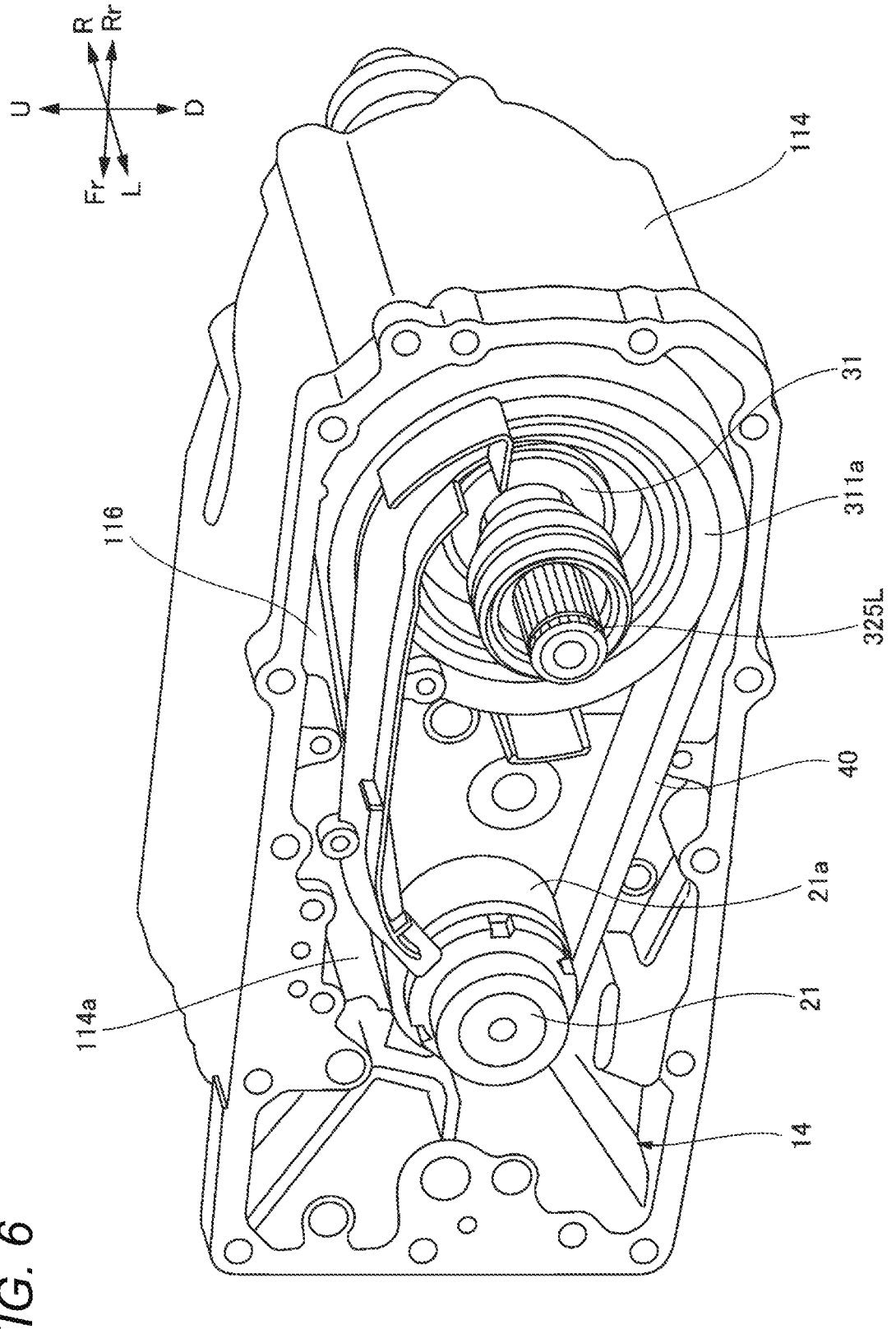
FIG. 6 is a perspective view of a left main case of the drive unit in FIG. 2 when viewed from a left side.
Figure 7:
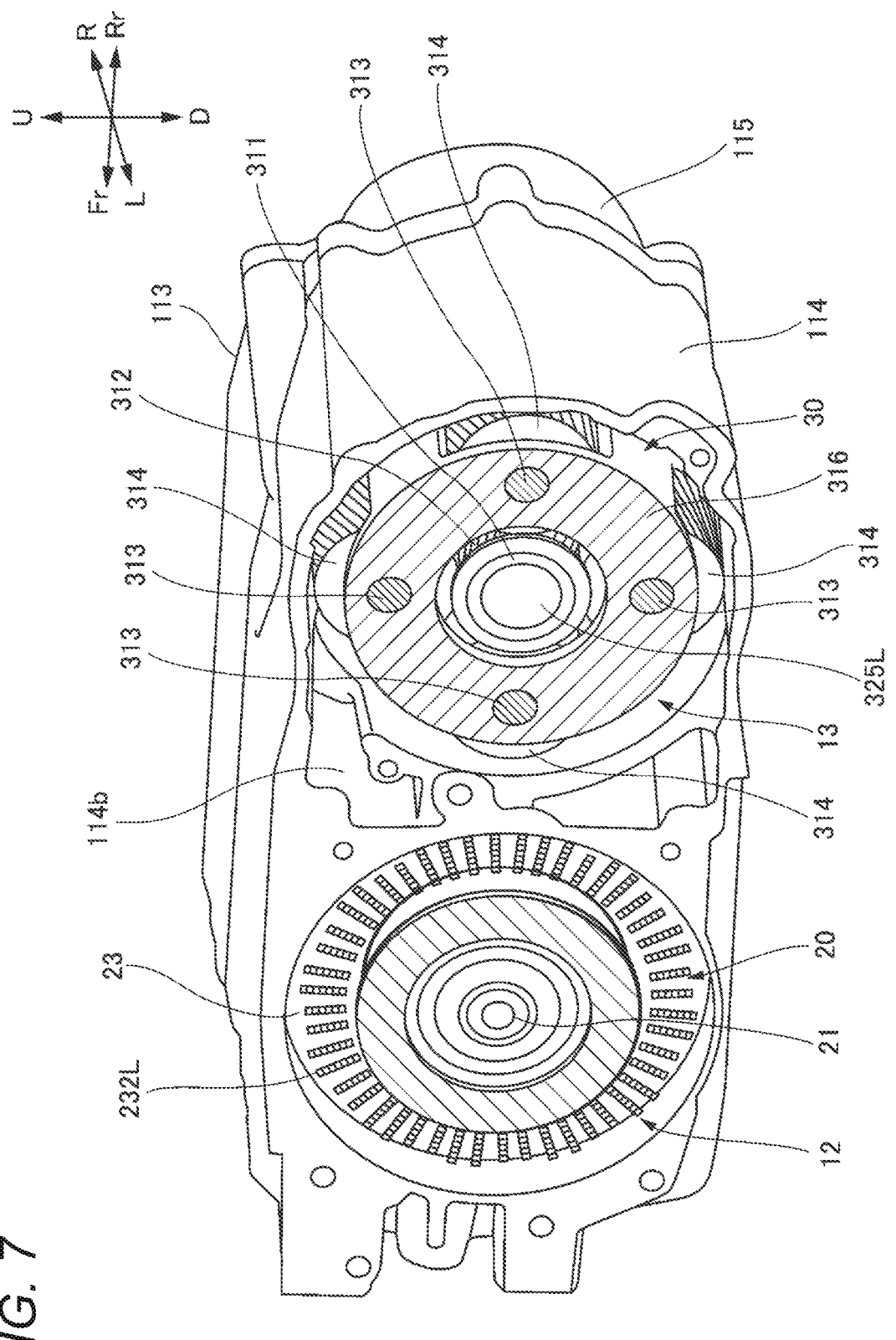
FIG. 7 is a cross-sectional view taken along a line A-A in FIG. 5.
Figure 8:
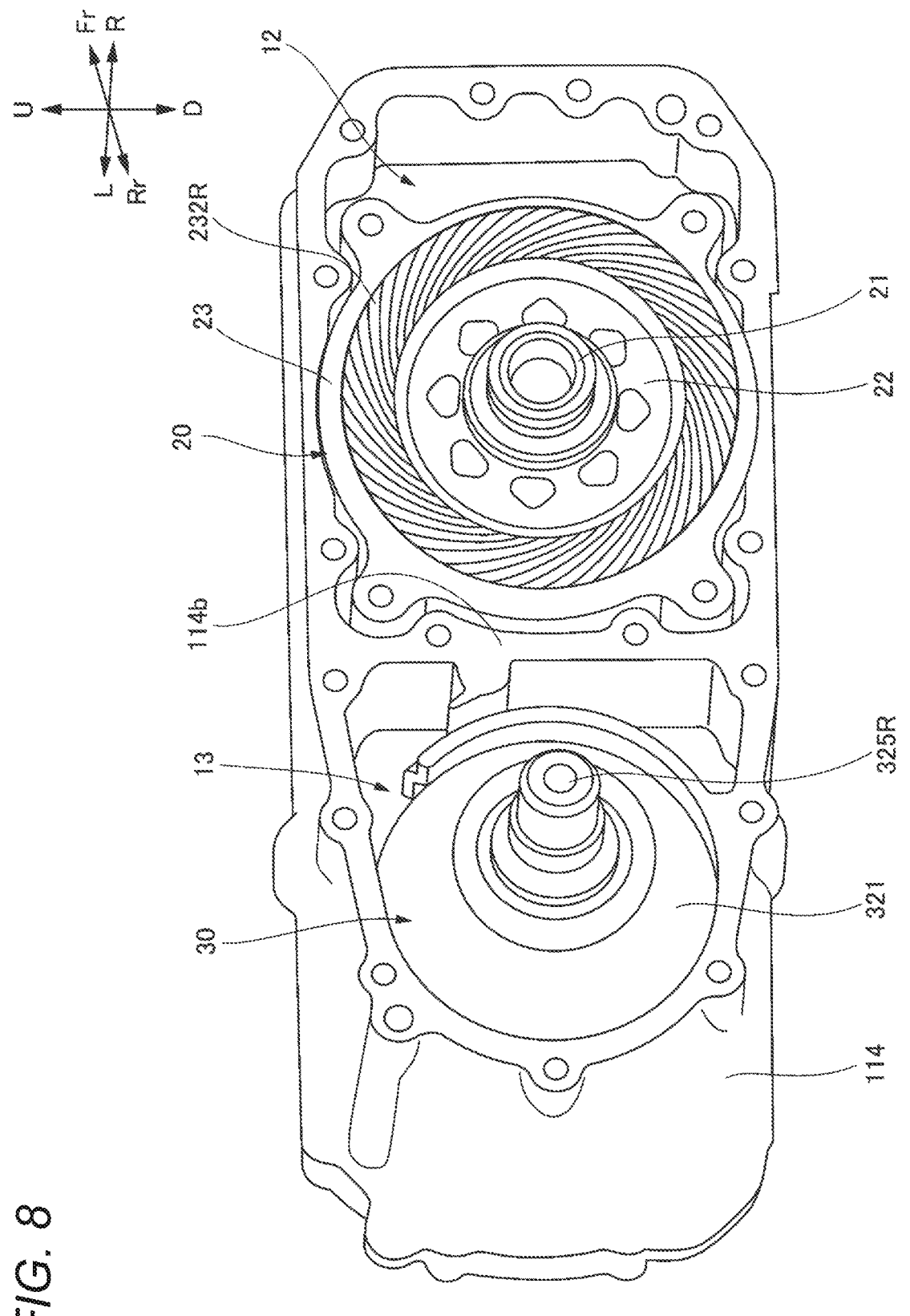
FIG. 8 is a perspective view of the left main case of the drive unit in FIG. 2 when viewed from a right side.

As shown in FIGS. 6 to 8, the left main case 114 forms the motor chamber 12, the gear chamber 13, and the chain chamber 14. The left main case 114 includes a first partition wall 114a partitioning the motor chamber 12 and the chain chamber 14, and a second partition wall 114b partitioning the motor chamber 12 and the gear chamber 13. The first partition wall 114a extends in the upper-lower direction and the front-rear direction between the drive sprocket 21a and the drive motor 20. The second partition wall 114b extends in the upper-lower direction and the left-right direction between the drive motor 20 and the deceleration device 30.

In the left main case 114, the motor chamber 12 is open rightward. In the left main case 114, the gear chamber 13 and the chain chamber 14 communicate with each other, and the left main case 114 is provided with a baffle plate 116 partitioning the gear chamber 13 and the chain chamber 14 (see also FIG. 4). The baffle plate 116 extends in the upper-lower direction and the front-rear direction between the driven sprocket 311a and the sun gear 312.

Figure 9:
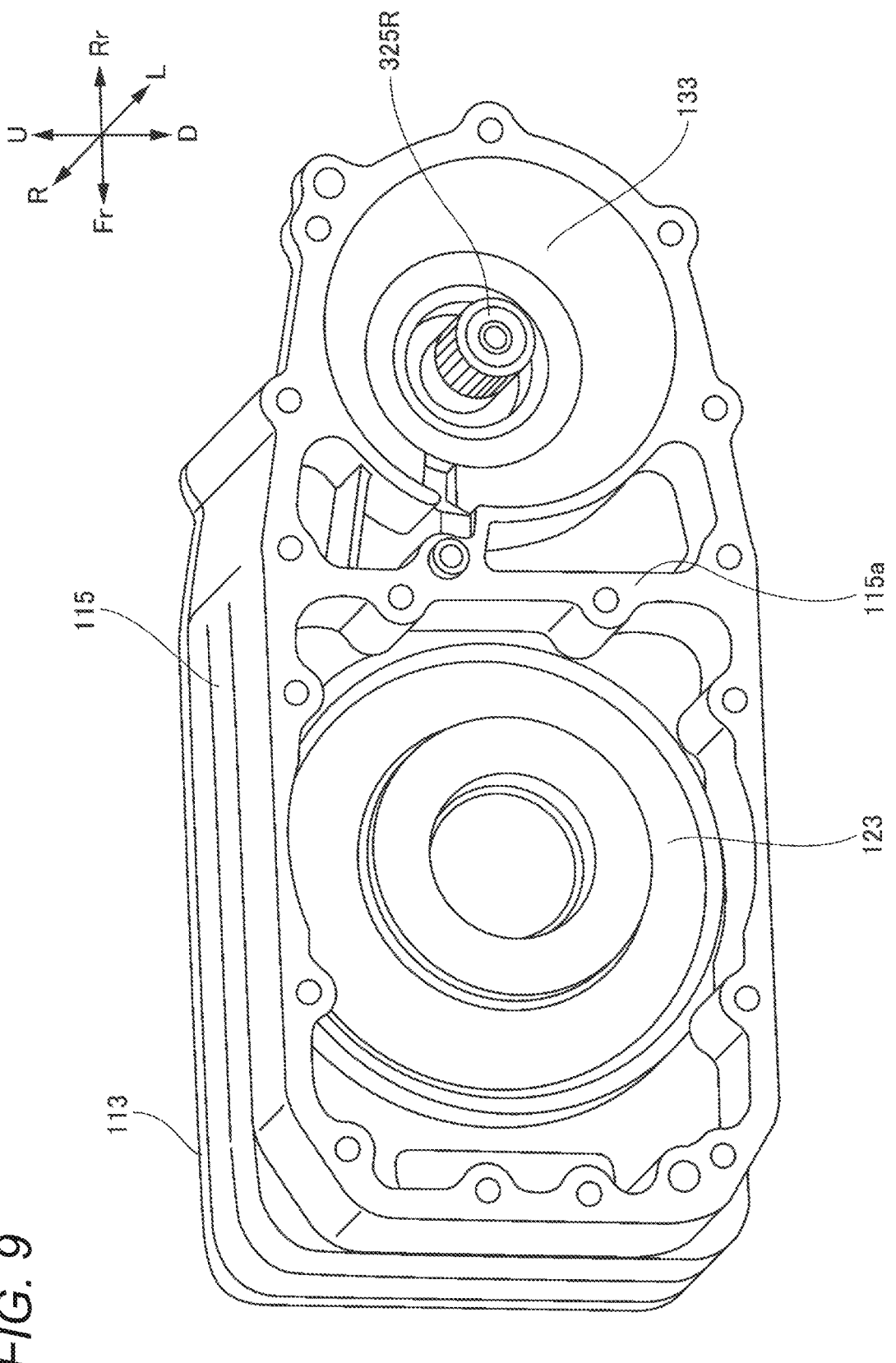
FIG. 9 is a perspective view of a right main case of the drive unit in FIG. 2 when viewed from a left side.
Figure 10:
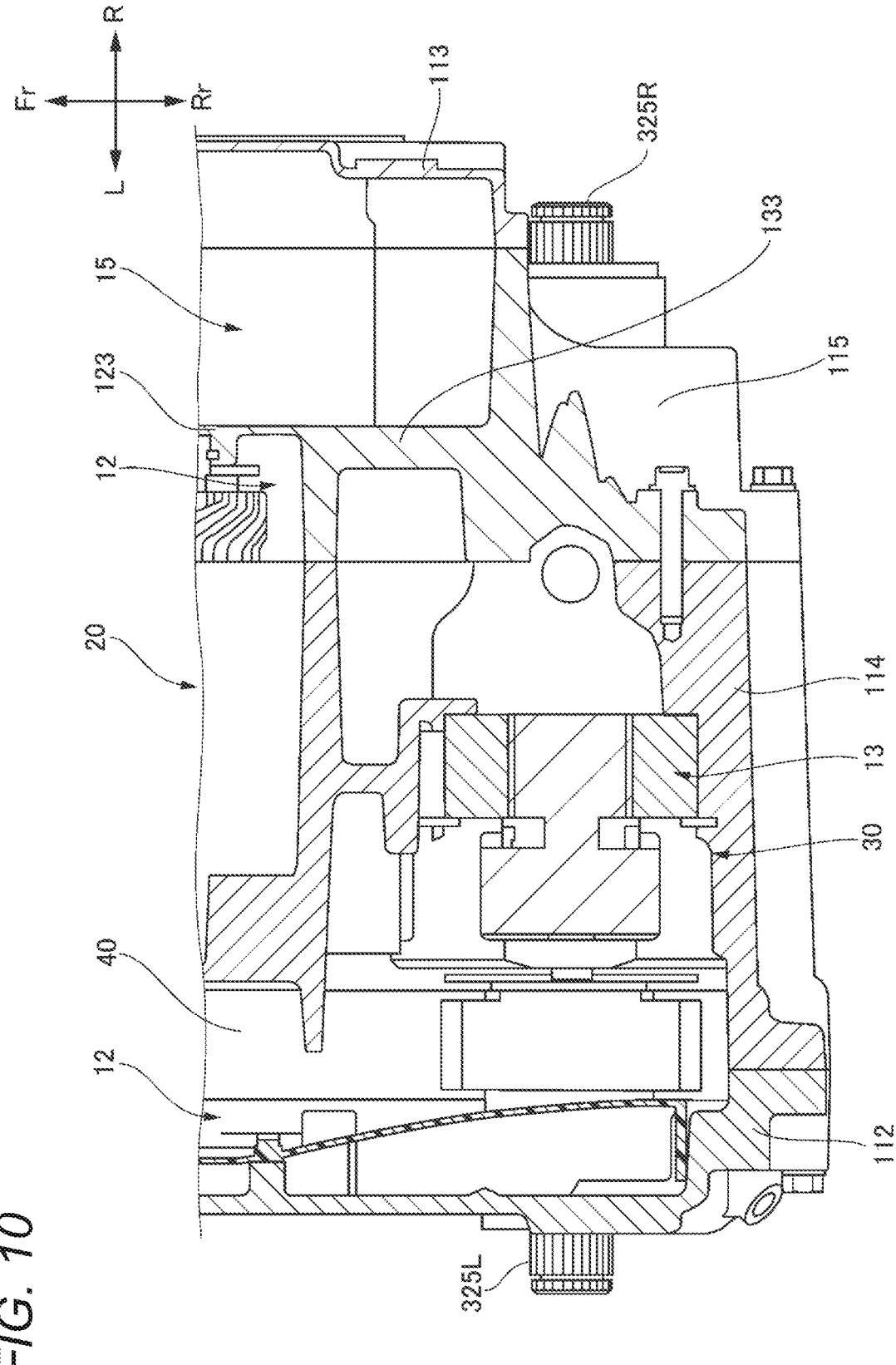
FIG. 10 is a cross-sectional view taken along a line B-B in FIG. 5.

As shown in FIGS. 9 and 10, the right main case 115 includes a right wall portion 123 that covers a right opening of the motor chamber 12 formed in the left main case 114. The right main case 115 further includes a right wall portion 133 that covers a right opening of the gear chamber 13 formed in the left main case 114, and a third partition wall 115a that partitions the motor chamber 12 and the gear chamber 13. The right main case 115 forms the controller chamber 15 on the right side of the right wall portion 123 including a front region of the right wall portion 133. In the right main case 115, the controller chamber 15 is open rightward.

The right side cover 113 covers a right opening of the controller chamber 15.

(Temperature Control System)

Figure 11:
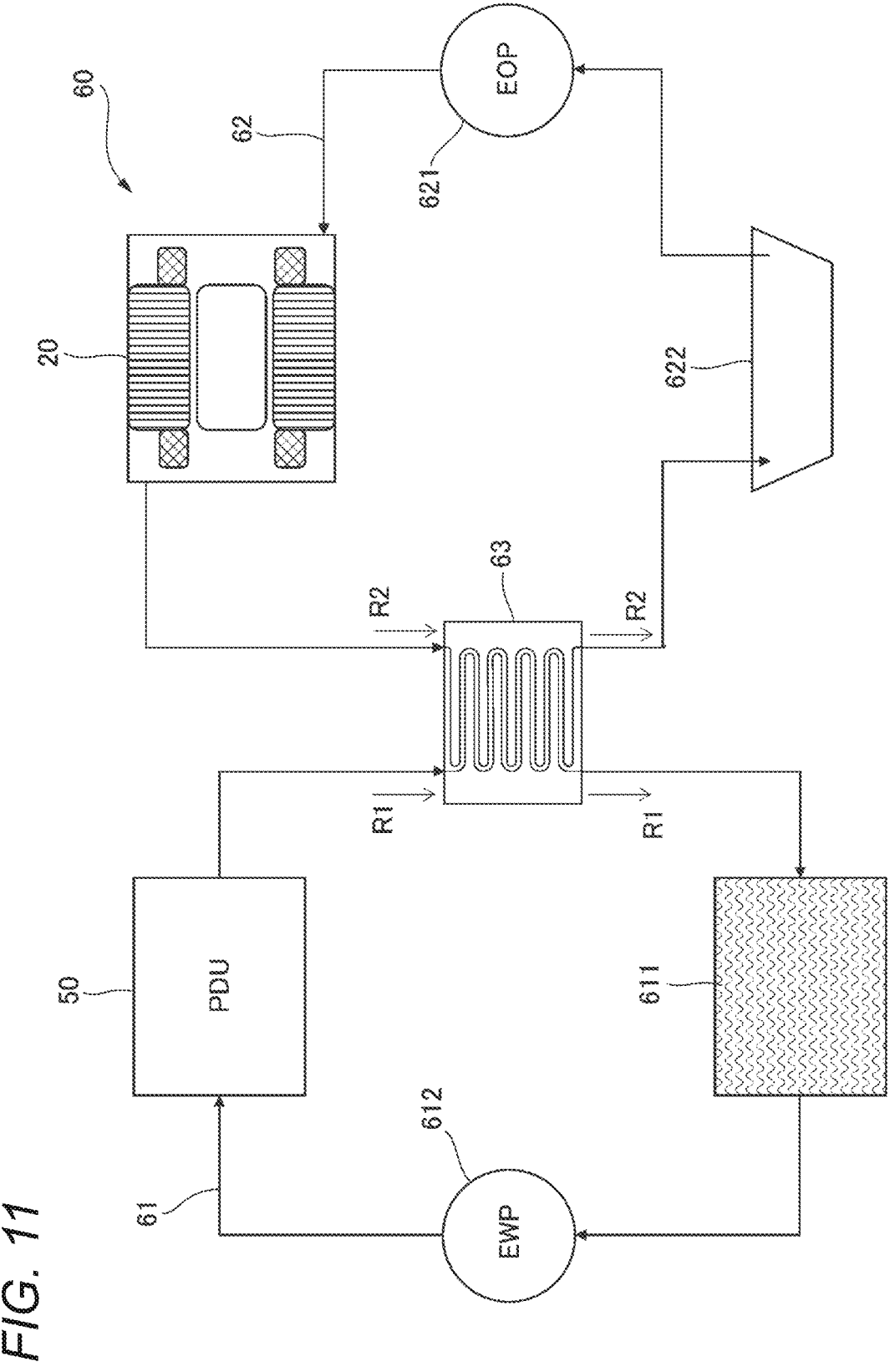
FIG. 11 is a block diagram of a temperature control system in the drive unit in FIG. 2.

As shown in FIG. 11, the vehicle V includes a temperature control system 60. The temperature control system 60 includes a first temperature control circuit 61 for circulating the above-described cooling water R1 and performing temperature control of the control device 50, a second temperature control circuit 62 for circulating the above-described motor cooling oil R2 and performing temperature control and lubrication of the drive motor 20, and the oil cooler 63 described above. As described above, the oil cooler 63 performs heat exchange between the cooling water R1 circulating in the first temperature control circuit 61 and the motor cooling oil R2 circulating in the second temperature control circuit 62.

In the first temperature control circuit 61, the cooling water R1 circulates through the cooling water pump 612, the control device 50, the oil cooler 63, and the radiator 611. The cooling water R1 pumped from the cooling water pump 612 is supplied to the control device 50 to control a temperature of the control device 50, then supplied from the control device 50 to the oil cooler 63 to perform heat exchange with the motor cooling oil R2 flowing through the second temperature control circuit 62, supplied to the radiator 611, cooled by heat exchange with external air, and then returned to the cooling water pump 612.

In the second temperature control circuit 62, the motor cooling oil R2 circulates through the oil pump 621, the drive motor 20, and the oil cooler 63. The inside of the drive unit case 11 is formed with a storage portion 622 for temporarily storing the motor cooling oil R2 cooled by the oil cooler 63. The motor cooling oil R2 temporarily stored in the storage portion 622 is pumped from the oil pump 621 and supplied into the drive unit case 11 to control a temperature of the drive motor 20. The motor cooling oil R2 is supplied from the drive unit case 11 to the oil cooler 63, cooled by heat exchange with the cooling water R1 flowing through the first temperature control circuit 61, and then flows into the storage portion 622 and is temporarily stored in the storage portion 622 again.

(Lubrication and Cooling of Gear Chamber and Chain Chamber)

Next, lubrication and cooling of the gear chamber 13 and the chain chamber 14 will be described with reference to FIGS. 12 to 21.

Figure 12:
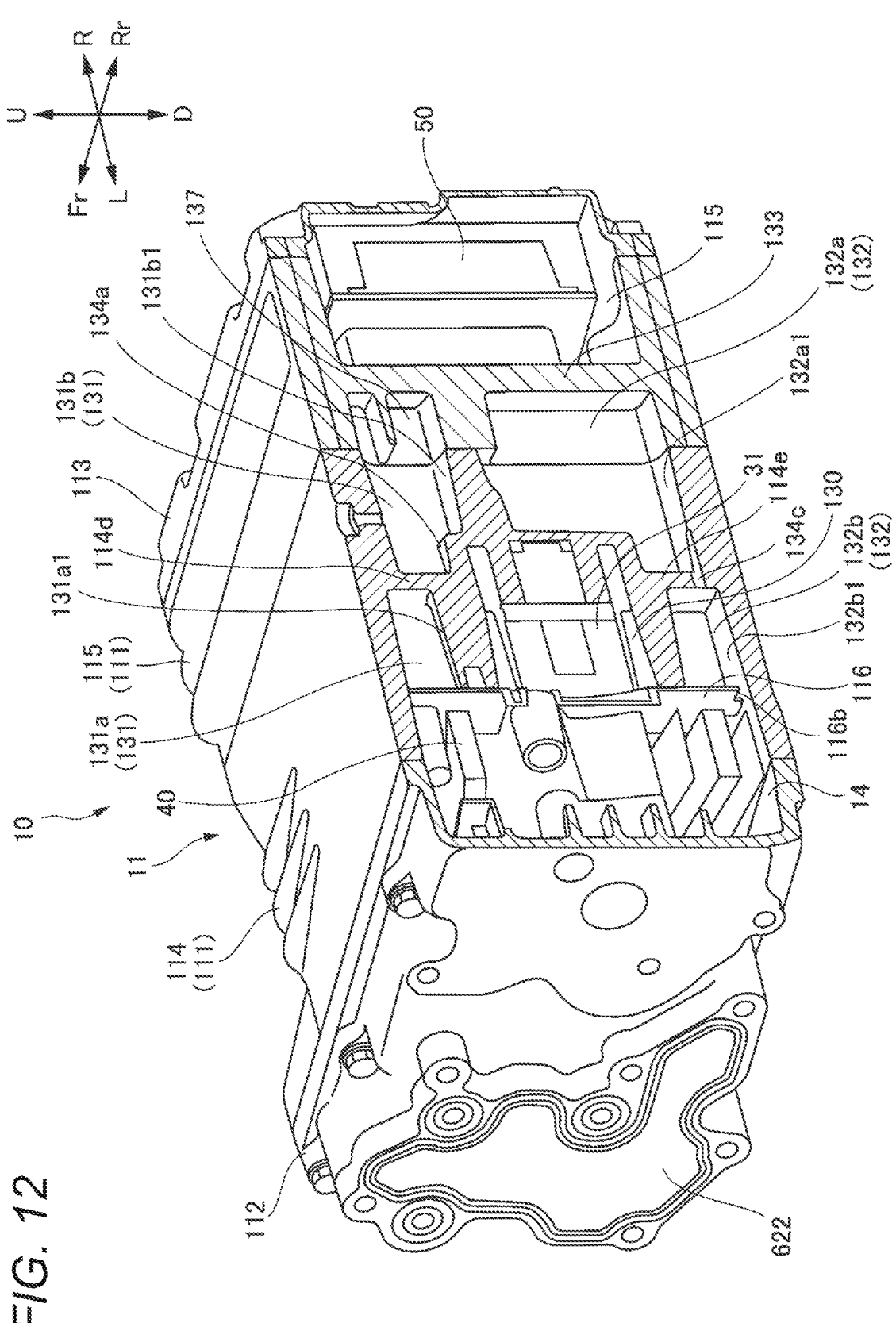
FIG. 12 is a perspective view in which a part of the drive unit in FIG. 2 is cut in a left-right direction.
Figure 13:
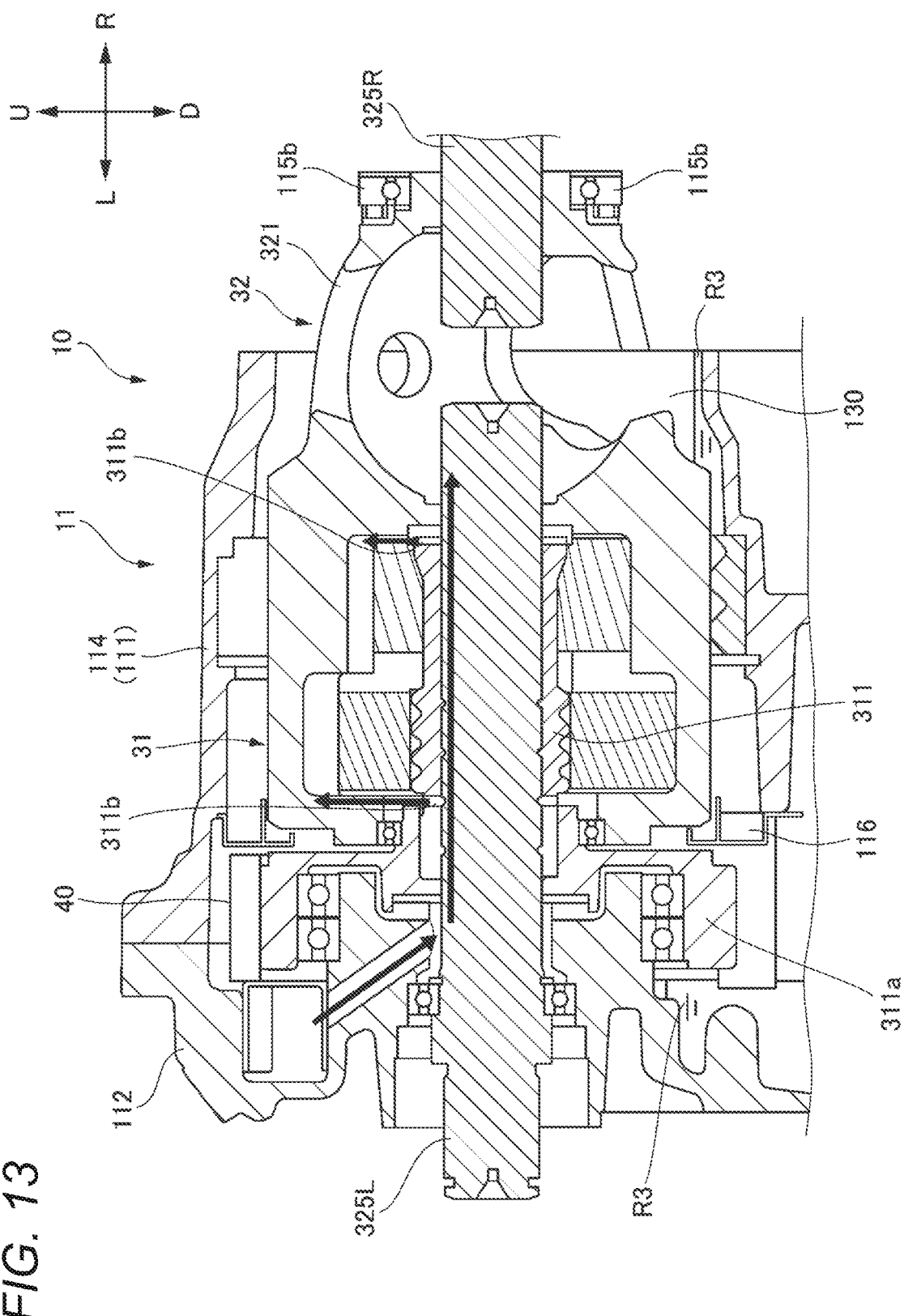
FIG. 13 is a cross-sectional view in which the drive unit in FIG. 2 is cut in the left-right direction along an axial center of a left drive shaft and a right drive shaft.
Figure 14:
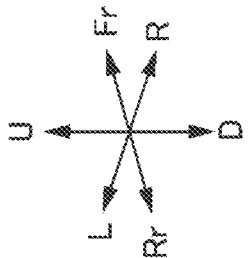
FIG. 14 is a perspective view of a left side cover and a baffle plate of the drive unit in FIG. 2.
Figure 14:
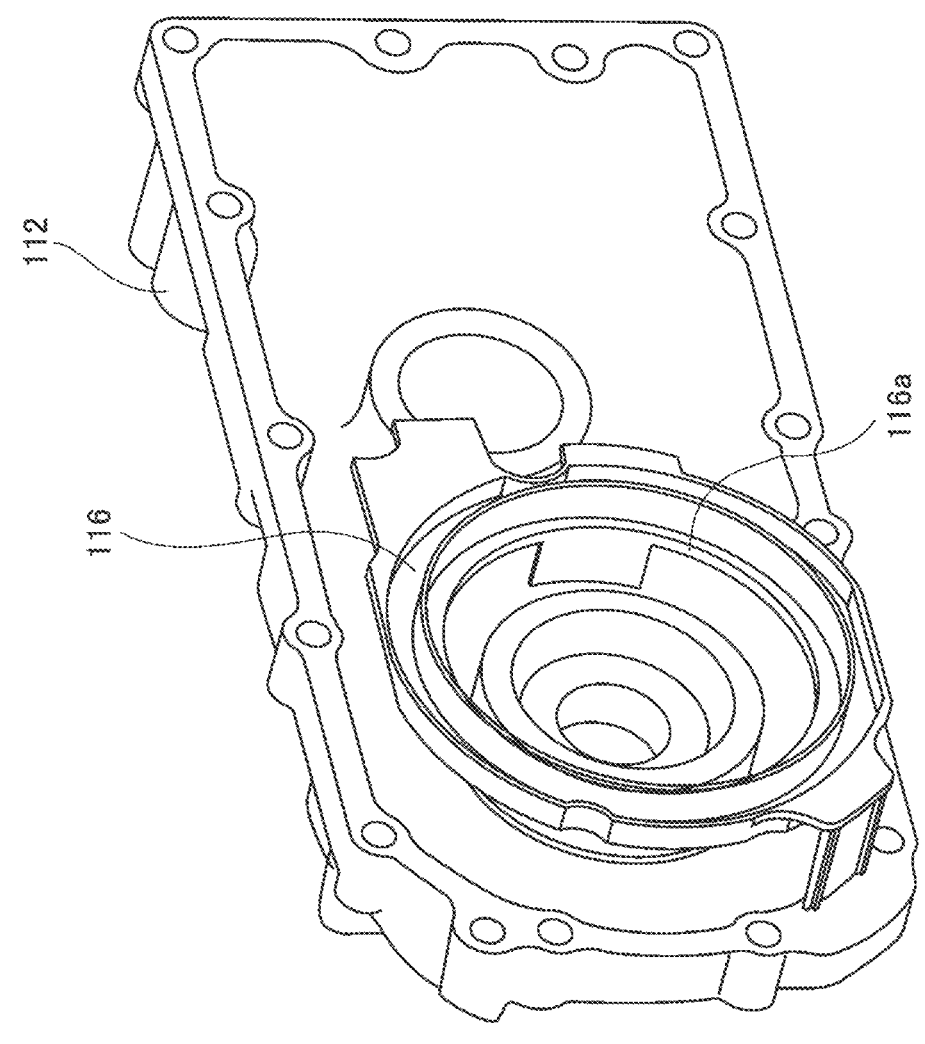
Figure 15:
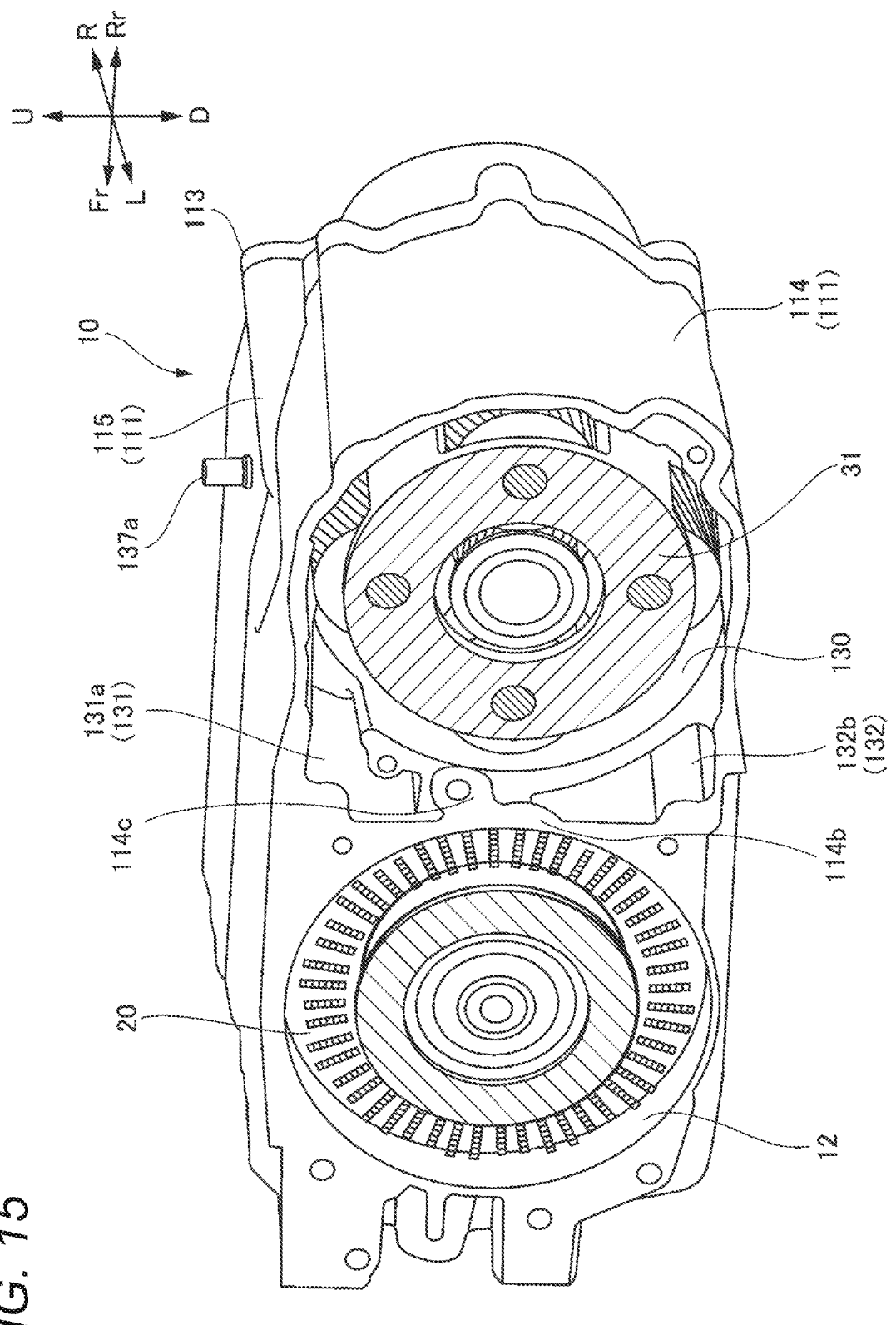
FIG. 15 is a perspective view in which a part of the drive unit in FIG. 2 is cut in a front-rear direction.
Figure 16:
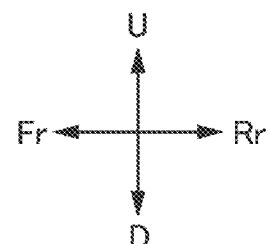
FIG. 16 is a cross-sectional view of a main part of a gear chamber in which a part of the drive unit in FIG. 2 is cut in the front-rear direction.
Figure 16:
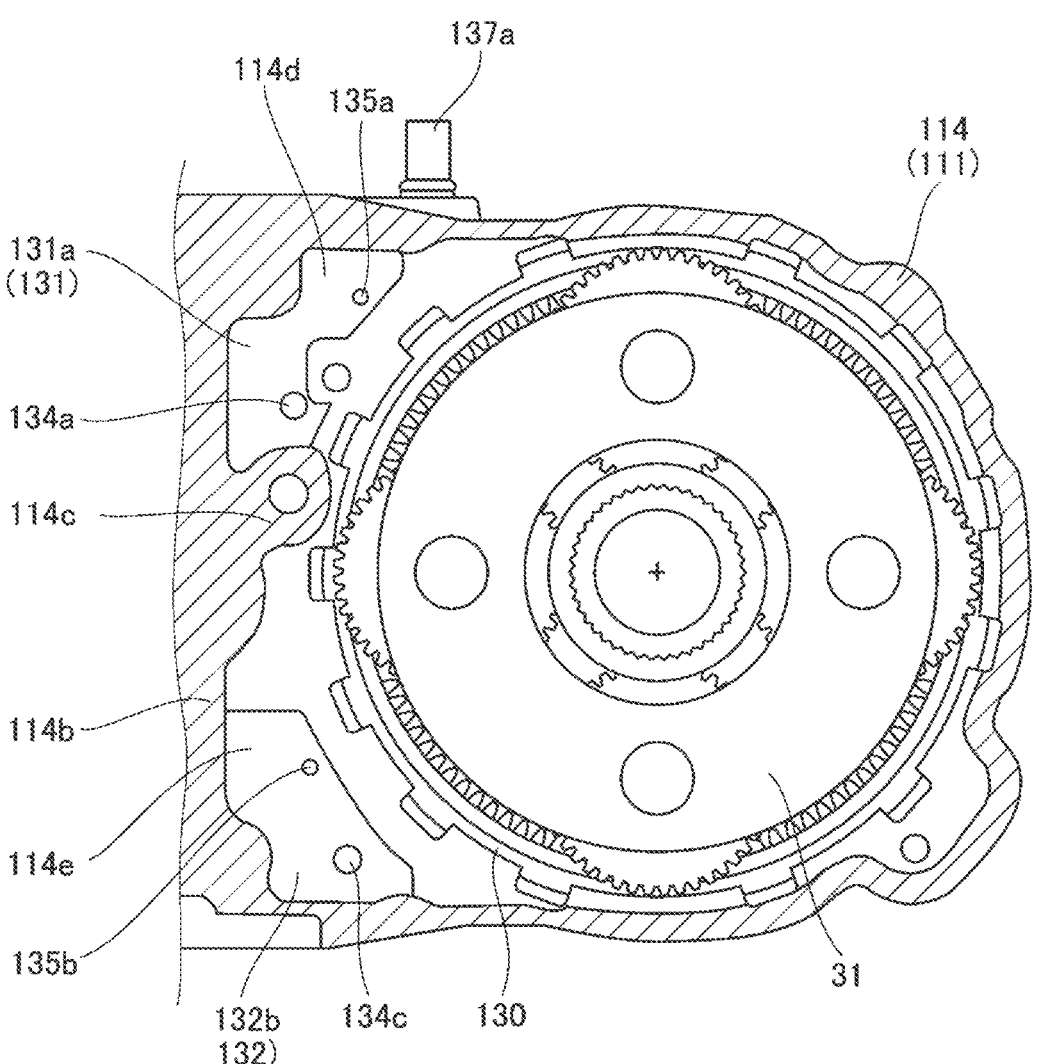
Figure 17:
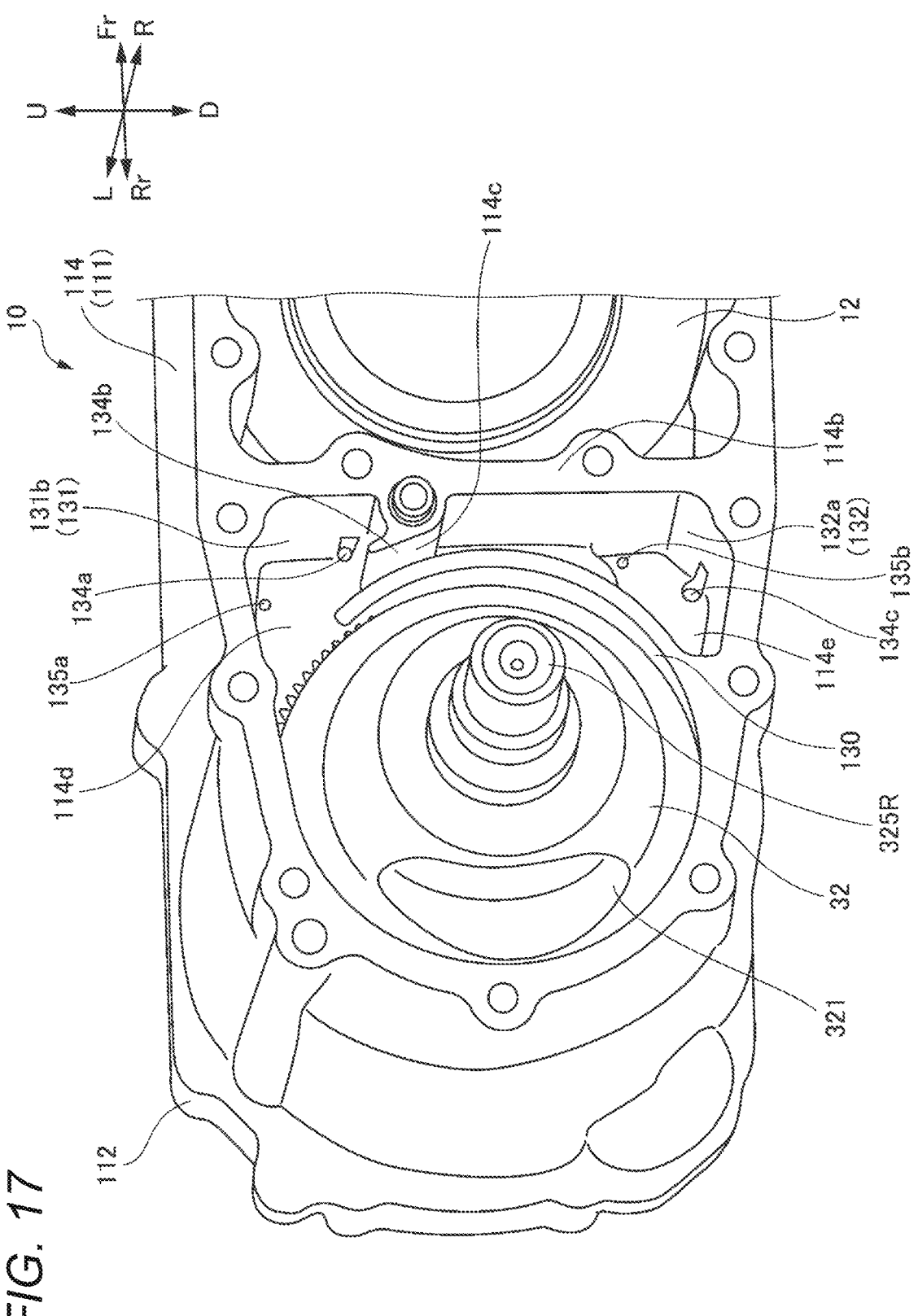
FIG. 17 is a perspective view of a main part of the gear chamber when the drive unit in FIG. 2 is viewed in a state in which the right main case is removed.
Figure 18:
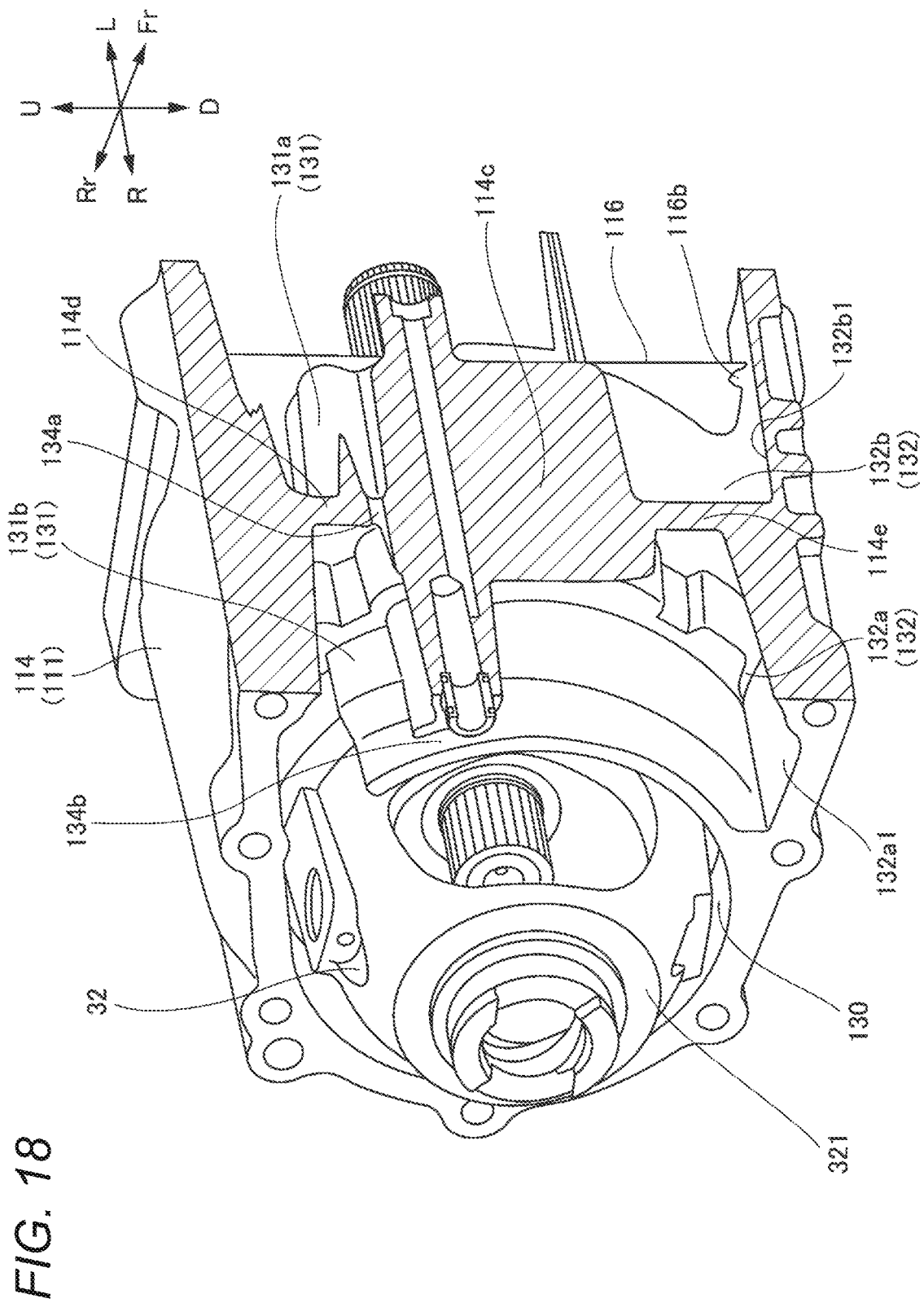
FIG. 18 is a perspective view in which a part of the drive unit in FIG. 2 is cut in the left-right direction in a state in which the right main case is removed.

As shown in FIGS. 12 to 14, the gear chamber 13 and the chain chamber 14 partitioned by the baffle plate 116 store a common fluid, that is, a lubricating oil R3. The lubricating oil R3 is, for example, an oil called an automatic transmission fluid (ATF). The lubricating oil R3 may be the same oil as the motor cooling oil R2, and is not mixed with the motor cooling oil R2 circulating through the second temperature control circuit 62. The lubricating oil R3 lubricates the deceleration device 30 provided in the gear chamber 13, and the drive sprocket 21a, the driven sprocket 311a, the power transmission chain 40, and the like provided in the chain chamber 14.

Specifically, in the chain chamber 14, a lower portion of the driven sprocket 311a is immersed in the lubricating oil R3 stored in a lower portion of the chain chamber 14 (see FIG. 13). Then, the lubricating oil R3 stored in the lower portion of the chain chamber 14 is picked up by the driven sprocket 311a, the lubricating oil R3 picked up by the driven sprocket 311a lubricates and cools the drive sprocket 21a, the driven sprocket 311a, the power transmission chain 40, and the like provided in the chain chamber 14.

Therefore, picking efficiency by the driven sprocket 311a is improved as a height of a liquid surface of the lubricating oil R3 in the chain chamber 14 increases.

In the gear chamber 13, the lubricating oil R3 picked up by the driven sprocket 311a in the chain chamber 14 is supplied to the gear chamber 13 through the inside of the input shaft 311. The lubricating oil R3 supplied from the chain chamber 14 lubricates and cools the deceleration device 30.

Specifically, an outer peripheral wall of the hollow input shaft 311 is formed, along the axial direction, with a plurality of oil supply holes 311b penetrating the outer peripheral wall in the radial direction. The lubricating oil R3 supplied into the hollow input shaft 311 is discharged to the radial direction outer side from the oil supply holes 311b by a centrifugal force due to the rotation of the input shaft 311. The lubricating oil R3 discharged to the radial direction outer side from the oil supply holes 311b lubricates and cools the planetary gear mechanism 31. Meanwhile, the lubricating oil R3 that is not discharged from the oil supply holes 311b flows from the left to the right in the axial direction inside the input shaft 311, and is discharged from a right end of the input shaft 311. The lubricating oil R3 discharged from the right end of the input shaft 311 is supplied to the differential gear mechanism 32 to lubricate and cool the differential gear mechanism 32.

Therefore, the deceleration device 30 can be sufficiently lubricated and cooled even when an amount of the lubricating oil R3 discharged from the oil supply holes 311*b* of the hollow input shaft 311 is increased and the height of the liquid surface of the lubricating oil R3 in the gear chamber 13 is lowered. Therefore, when the amount of the lubricating oil R3 discharged from the oil supply holes 311*b* of the hollow input shaft 311 is increased and the height of the liquid surface of the lubricating oil R3 in the gear chamber 13 is lowered, agitation resistance when agitating the lubricating oil R3 by rotation of the deceleration device 30 is reduced and loss during the rotation of the deceleration device 30 is reduced.

In this way, the height of the liquid surface of the lubricating oil R3 in the chain chamber 14 is desirably high, and the height of the liquid surface of the lubricating oil R3 in the gear chamber 13 is desirably low.

The gear chamber 13 is formed with an accommodation chamber 130 that accommodates the planetary gear mechanism 31 and the differential gear mechanism 32. The accommodation chamber 130 has a substantially circular cross-section when viewed in the rotation axis direction of the planetary gear mechanism 31 and the differential gear mechanism 32. A lower portion of the accommodation chamber 130 stores a part of the lubricating oil R3 supplied from the chain chamber 14 to the gear chamber 13 through the inside of the input shaft 311. A lower portion of the planetary gear mechanism 31 and a lower portion of the differential gear mechanism 32 are immersed in the lubricating oil R3 stored in the lower portion of the accommodation chamber 130 (see FIG. 13). The lubricating oil R3 stored in the lower portion of the accommodation chamber 130 is picked up due to the rotation of the planetary gear mechanism 31 and the differential gear mechanism 32, and lubrication and cooling are also performed by the lubricating oil R3 picked up due to the rotation of the planetary gear mechanism 31 and the differential gear mechanism 32.

In the present embodiment, as described above, in the left main case 114, the gear chamber 13 and the chain chamber 14 communicate with each other, and the left main case 114 is provided with the baffle plate 116 partitioning the gear chamber 13 and the chain chamber 14. The baffle plate 116 extends in the upper-lower direction and the front-rear direction between the driven sprocket 311*a* and the sun gear 312.

The baffle plate 116 extends upward from bottom portions of the chain chamber 14 and the gear chamber 13, and limits a flow of the lubricating oil R3 between the chain chamber 14 and the gear chamber 13.

Accordingly, the height of the liquid surface of the lubricating oil R3 in the chain chamber 14 can be different from the height of the liquid surface of the lubricating oil R3 in the gear chamber 13, the height of the liquid surface of the lubricating oil R3 in the chain chamber 14 can be high, and the height of the liquid surface of the lubricating oil R3 in the gear chamber 13 can be low. Thus, it is possible to reduce the agitation resistance of the lubricating oil R3 caused by the rotation of the deceleration device 30 while improving lubrication performance in the gear chamber 13 and the chain chamber 14.

In the present embodiment, the height of the liquid surface of the lubricating oil R3 in the chain chamber 14 and the height of the liquid surface of the lubricating oil R3 in the gear chamber 13 are different.

Accordingly, the height of the liquid surface of the lubricating oil R3 in the chain chamber 14 and the height of the liquid surface of the lubricating oil R3 in the gear chamber 13 can be optimized individually.

In the present embodiment, the height of the liquid surface of the lubricating oil R3 in the gear chamber 13 is lower than the height of the liquid surface of the lubricating oil R3 in the chain chamber 14.

Accordingly, it is possible to reduce the agitation resistance of the lubricating oil R3 caused by the rotation of the deceleration device 30 while improving the lubrication performance in the gear chamber 13 and the chain chamber 14.

The baffle plate 116 is a plate-shaped member having a circular opening 116*a* at a center. The input shaft 311 is inserted into the opening 116*a*. As described above, the input shaft 311 is provided with the sun gear 312, and the driven sprocket 311*a* is attached on the left side relative to the sun gear 312.

In this way, since the baffle plate 116 not only partitions lower portions of the chain chamber 14 and the gear chamber 13, but also extends toward the radial direction outer side around the input shaft 311, the height of the liquid surface of the lubricating oil R3 in the chain chamber 14 and the height of the liquid surface of the lubricating oil R3 in the gear chamber 13 can be different from each other, and in addition, the lubricating oil R3 scattered due to the rotation of the driven sprocket 311*a* and the deceleration device 30 can be limited from flowing between the chain chamber 14 and the gear chamber 13.

In the present embodiment, the planetary gear mechanism 31 rotates counterclockwise when viewed from the left. Since the ring gear 317 is fixed to the drive unit case 11, the sun gear 312 rotates counterclockwise when viewed from the left, and the first planetary gear 314*a* that meshes with the sun gear 312 and the second planetary gear 314*b* that is formed integrally with the first planetary gear 314*a* and meshes with the ring gear 317 revolve counterclockwise when viewed from the left while rotating clockwise when viewed from the left.

As shown in FIGS. 15 to 19, an upper portion of the gear chamber 13 is formed with an upper space 131. The upper space 131 is formed between the motor chamber 12 and the accommodation chamber 130 of the gear chamber 13. The upper space 131 is formed in the accommodation chamber 130 and communicates with the accommodation chamber 130. The upper space 131 is formed by a wall portion of the drive unit case 11 on a rotation direction side (the front side in the present embodiment) of an upper end of the input shaft 311, that is, by the second partition wall 114*b* in the present embodiment.

The lower portion in the gear chamber 13 is formed with a lower space 132. The lower space 132 is partitioned into a separate chamber from the accommodation chamber 130.

The lower space 132 is formed below the upper space 131. The lower space 132 is formed between the motor chamber 12 and the accommodation chamber 130 of the gear chamber 13. The upper space 131 and the lower space 132 are separated by an upper-lower partition wall 114*c* extending rearward from the second partition wall 114*b*.

The upper space 131 and the lower space 132 are formed between the motor chamber 12 and the accommodation chamber 130 of the gear chamber 13, and both store the lubricating oil R3.

Accordingly, the upper space 131 and the lower space 132 can be provided while limiting an increase in an upper-lower dimension of the drive unit case 11. By storing the lubricating oil R3 in the upper space 131 and the lower space 132, the height of the liquid surface of the lubricating oil R3 stored in the lower portion of the accommodation chamber 130 can be lowered, and thus the agitation resistance of the lubricating oil R3 caused by the rotation of the deceleration device 30 can be reduced.

Meanwhile, the upper space 131 and the lower space 132 do not allow the motor cooling oil R2 to flow in.

Accordingly, the motor cooling oil R2 and the lubricating oil R3 are not mixed, thus the motor cooling oil R2 and the lubricating oil R3 can be divided into different contamination levels, and the lubricating oil R3, which tends to contain a large amount of sludge, can be prevented from being supplied to the drive motor 20.

The motor chamber 12 has a substantially circular cross-section when viewed in an output rotation axis direction of the drive motor 20. The accommodation chamber 130 has a substantially circular cross-section when viewed in an output rotation axis direction of the deceleration device 30.

When viewed in the rotation axis direction of the drive motor 20, the planetary gear mechanism 31, and the differential gear mechanism 32, that is, the left-right direction, the upper space 131 is formed in a region between the motor chamber 12 and the accommodation chamber 130 above a rotation axis of the drive motor 20 and rotation axes of the planetary gear mechanism 31 and the differential gear mechanism 32, and the lower space 132 is formed in a region between the motor chamber 12 and the accommodation chamber 130 below the rotation axis of the drive motor 20 and the rotation axes of the planetary gear mechanism 31 and the differential gear mechanism 32.

Accordingly, it is possible to effectively use a space in the regions above and below the output rotation axis of the drive motor 20 and the output rotation axis of the deceleration device 30 between the motor chamber 12 and the accommodation chamber 130 when viewed in the output rotation axis direction of the drive motor 20 and the deceleration device 30, that is, the left-right direction, and thus the upper space 131 and the lower space 132 serving as storage portions for storing the lubricating oil R3 can be provided while limiting an increase in the upper-lower dimension of the drive unit case 11.

When viewed in a direction of a virtual straight line VL1 (the front-rear direction in the present embodiment) orthogonal to the output rotation axis of the drive motor 20 and the output rotation axis of the deceleration device 30, both the upper space 131 and the lower space 132 at least partially overlap the motor chamber 12 and the accommodation chamber 130.

Accordingly, a projection area of the drive unit case 11 when viewed in the direction of the virtual straight line VL1 (the front-rear direction in the present embodiment) can be reduced, and thus the drive unit case 11 can be downsized.

In particular, in the present embodiment, the upper space 131 and the lower space 132 are both formed such that half or more of a projection area thereof viewed in the direction of the virtual straight line VL1 (the front-rear direction in the present embodiment) overlaps the motor chamber 12 and the accommodation chamber 130.

Accordingly, the projection area of the drive unit case 11 when viewed in the direction of the virtual straight line VL1 (the front-rear direction in the present embodiment) can be further reduced, and thus the drive unit case 11 can be downsized.

The upper space 131 extends in an axial direction of the output rotation axis of the deceleration device 30, and is partitioned into a planetary-side upper storage portion 131*a* and a differential-side upper storage portion 131*b* in the axial direction of the output rotation axis of the deceleration device 30.

The lower space 132 extends in the axial direction of the output rotation axis of the deceleration device 30, and is partitioned into a differential-side lower storage chamber 132*a* and a planetary-side lower storage chamber 132*b* in the axial direction of the output rotation axis of the deceleration device 30.

In this way, since the upper space 131 and the lower space 132 are longer in the axial direction of the output rotation axis of the deceleration device 30 and are partitioned into a plurality of spaces in the axial direction of the output rotation axis of the deceleration device 30, it is possible to increase a time during which the lubricating oil R3 stays in the upper space 131. Accordingly, it is possible to eliminate foam of the foamed lubricating oil R3 and to lower a temperature of the lubricating oil R3.

The upper space 131, that is, the planetary-side upper storage portion 131*a* and the differential-side upper storage portion 131*b* are integrally formed by casting in the drive unit case 11 (the left main case 114 in the present embodiment).

Similarly, the lower space 132, that is, the differential-side lower storage chamber 132*a* and the planetary-side lower storage chamber 132*b* are integrally formed by casting in the drive unit case 11 (the left main case 114 in the present embodiment).

Accordingly, the upper space 131 and the lower space 132, more specifically, the planetary-side upper storage portion 131*a*, the differential-side upper storage portion 131*b*, the differential-side lower storage chamber 132*a*, and the planetary-side lower storage chamber 132*b* can be formed at low cost.

The planetary-side upper storage portion 131*a* is provided above the rotation axis of the input shaft 311 and below an upper end of the planetary gear mechanism 31 in the upper-lower direction at a position where at least a part thereof overlaps the planetary gear mechanism 31 in the axial direction of the input shaft 311. The position where at least a part thereof overlaps the planetary gear mechanism 31 in the axial direction of the input shaft 311 refers to a position where at least a part thereof overlaps the planetary gear mechanism 31 in the axial direction of the input shaft 311 when viewed from a predetermined direction on the radial direction outer side of the input shaft 311 toward a center of the input shaft 311.

The planetary-side upper storage portion 131*a* collects and stores a part of the lubricating oil R3 that is picked up from the lower portion of the accommodation chamber 130 by the planetary gear mechanism 31 and scattered.

In addition, the planetary-side upper storage portion 131*a* collects and stores a part of the lubricating oil R3 discharged and scattered to the radial direction outer side from the oil supply hole 311*b* of the input shaft 311.

Accordingly, since the planetary-side upper storage portion 131*a* collects the lubricating oil R3 that is discharged and scattered toward the radial direction outer side from the oil supply hole 311*b* of the input shaft 311 and the lubricating oil R3 that is picked up by the planetary gear mechanism 31 and scattered, the height of the liquid surface of the lubricating oil R3 stored in the lower portion of the accommodation chamber 130 can be further lowered, and thus the agitation resistance of the lubricating oil R3 caused by the rotation of the deceleration device 30 can be further reduced. In this way, a dimension in a height direction of the drive unit 10 can be reduced without lowering power transmission efficiency.

The differential-side upper storage portion 131b is provided above the rotation axis of the differential case 321 and below an upper end of the differential case 321 in the upper-lower direction at a position where at least a part thereof overlaps the differential gear mechanism 32 in a rotation axis direction of the differential case 321. The position where at least a part thereof overlaps the differential gear mechanism 32 in the rotation axis direction of the differential case 321 refers to a position where at least a part thereof overlaps the differential gear mechanism 32 in the rotation axis direction of the differential case 321 when viewed from a predetermined direction on the radial direction outer side of the differential case 321 toward a rotation axial center of the differential case 321.

The differential-side upper storage portion 131b collects and stores a part of the lubricating oil R3 picked up by the differential gear mechanism 32 including the differential case 321 and scattered from the lubricating oil R3 stored in the lower portion of the gear chamber 13.

In addition, the differential-side upper storage portion 131b collects and stores a part of the lubricating oil R3 discharged from the right end of the input shaft 311 toward the differential gear mechanism 32 and scattered due to the rotation of the differential gear mechanism 32.

Accordingly, since the differential-side upper storage portion 131b collects the lubricating oil R3 discharged from the right end of the input shaft 311 toward the differential gear mechanism 32 and scattered due to the rotation of the differential gear mechanism 32, and the lubricating oil R3 picked up by the differential gear mechanism 32 including the differential case 321 and scattered from the lower portion of the accommodation chamber 130, the height of the liquid surface of the lubricating oil R3 stored in the lower portion of the accommodation chamber 130 can be further lowered, and thus the agitation resistance of the lubricating oil R3 due to the rotation of the deceleration device 30 can be further reduced.

In the left main case 114, the planetary-side upper storage portion 131a and the differential-side upper storage portion 131b are adjacent in the rotation axis direction of the planetary gear mechanism 31 and the differential gear mechanism 32 with an upper partition wall 114d interposed therebetween. The upper partition wall 114d is provided with a first oil flow hole 134a that establishes communication between the planetary-side upper storage portion 131a and the differential-side upper storage portion 131b and through which the lubricating oil R3 flows.

Accordingly, the lubricating oil R3 stored in the planetary-side upper storage portion 131a can flow to the differential-side upper storage portion 131b.

Further, a height of a bottom surface 131a1 of the planetary-side upper storage portion 131a is higher than a height of a bottom surface 131b1 of the differential-side upper storage portion 131b.

Accordingly, the lubricating oil R3 stored in the planetary-side upper storage portion 131a can easily flow to the differential-side upper storage portion 131b.

In the left main case 114, above the first oil flow hole 134a, the upper partition wall 114d is provided with a first vent hole 135a that establishes communication between the planetary-side upper storage portion 131a and the differential-side upper storage portion 131b and through which gas in the planetary-side upper storage portion 131a and the differential-side upper storage portion 131b flows.

Accordingly, a pressure in the planetary-side upper storage portion 131a and the differential-side upper storage portion 131b is prevented from increasing due to the gas in the planetary-side upper storage portion 131a and the differential-side upper storage portion 131b, and thus the lubricating oil R3 stored in the planetary-side upper storage portion 131a can be prevented from becoming difficult to flow into the differential-side upper storage portion 131b.

The differential-side lower storage chamber 132a is provided below the differential-side upper storage portion 131b. In the left main case 114, the differential-side upper storage portion 131b and the differential-side lower storage chamber 132a are adjacent in the upper-lower direction with the upper-lower partition wall 114c interposed therebetween. That is, the upper-lower partition wall 114c forms a bottom wall of the differential-side upper storage portion 131b and an upper wall of the differential-side lower storage chamber 132a. The upper-lower partition wall 114c is provided with a second oil flow hole 134b that establishes communication between the differential-side upper storage portion 131b and the differential-side lower storage chamber 132a and through which the lubricating oil R3 flows.

As described above, in the lower portion of the gear chamber 13, since the lower space 132 is partitioned into a separate chamber from the accommodation chamber 130, the differential-side lower storage chamber 132a is also a separate chamber from the accommodation chamber 130, and thus the lubricating oil R3 flowing from the planetary-side upper storage portion 131a to the differential-side upper storage portion 131b and stored in the differential-side upper storage portion 131b does not flow into the accommodation chamber 130, but flows through the second oil flow hole 134b into the differential-side lower storage chamber 132a that is a separate chamber from the accommodation chamber 130.

Accordingly, the height of the liquid surface of the lubricating oil R3 stored in the accommodation chamber 130 can be maintained at a lower level, and thus the agitation resistance of the lubricating oil R3 when the deceleration device 30 rotates can be further reduced.

Figure 19:
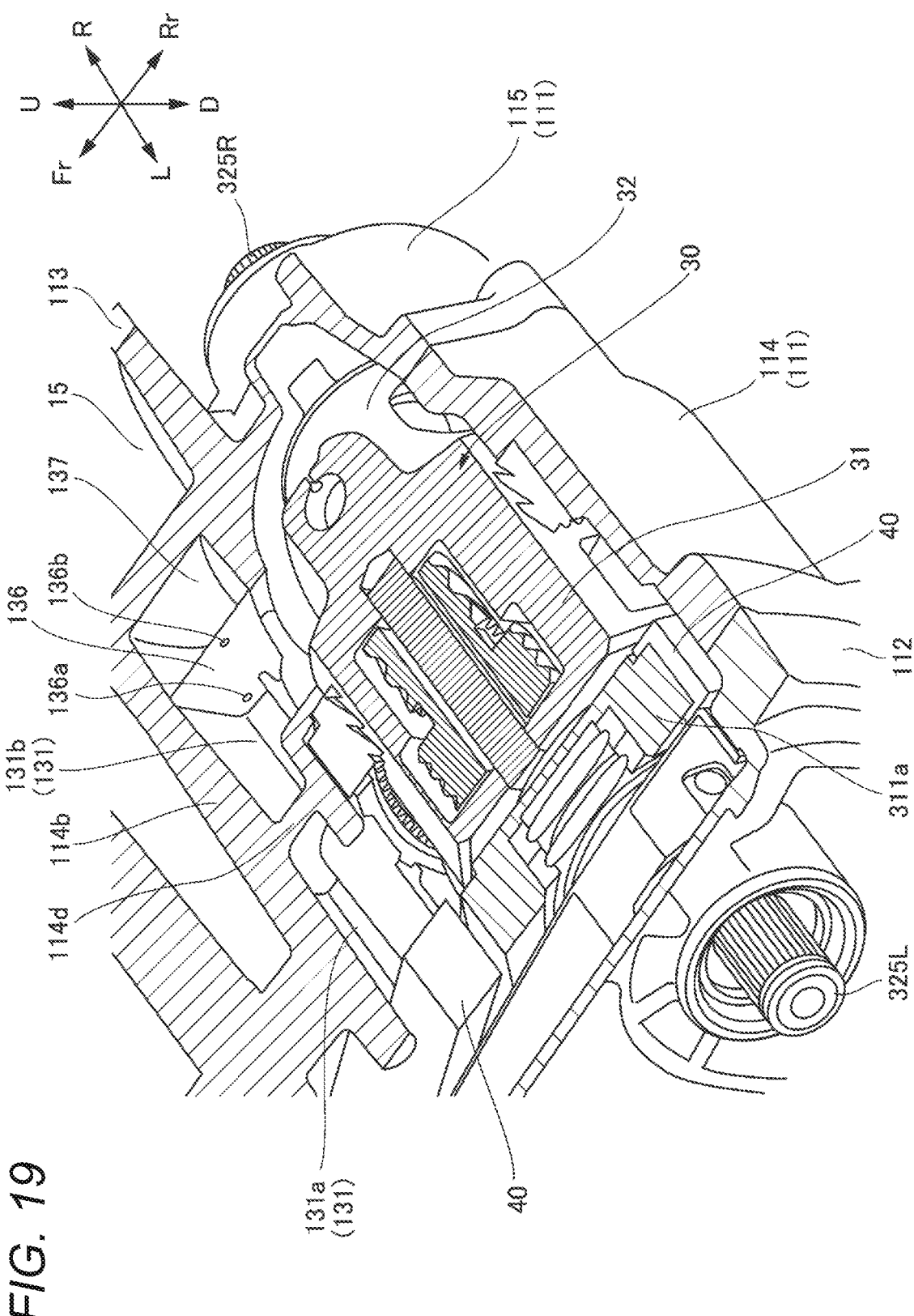
FIG. 19 is a perspective view in which a part of the drive unit in FIG. 2 is cut in the left-right direction.

As shown in FIG. 19, the left main case 114 and the right main case 115 are assembled with a gasket 136 interposed therebetween. The gasket 136 is a plate-shaped member extending in the upper-lower direction and the front-rear direction. The differential-side upper storage portion 131b is formed on the left side of the gasket 136, and a wall portion of the differential-side upper storage portion 131b is formed by the left main case 114 and the gasket 136. The gasket 136 forms at least a part of a right wall of the differential-side upper storage portion 131b. A breather chamber 137 adjacent to the differential-side upper storage portion 131b with the gasket 136 interposed therebetween is formed on the right side of the gasket 136, and a wall portion of the breather chamber 137 is formed by the right main case 115 and the gasket 136. The gasket 136 forms at least a part of a left wall of the breather chamber 137.

Accordingly, it is possible to form the wall portion of the differential-side upper storage portion 131b and the breather chamber 137 at low cost while limiting an increase in weight.

The gasket 136 is provided with an oil flow hole 136a that establishes communication between the differential-side upper storage portion 131b and the breather chamber 137 and through which the remaining lubricating oil R3 that does not flow into the second oil flow hole 134b among the lubricating oil R3 stored in the differential-side upper storage portion 131b passes. Further, above the oil flow hole 136a, the gasket 136 is provided with a communication hole 136b that establishes communication between the differential-side upper storage portion 131b and the breather chamber 137 and through which gas and mist of the lubricating oil R3 in the differential-side upper storage portion 131b and the breather chamber 137 flow.

Accordingly, it is possible to easily form the oil flow hole 136a and the communication hole 136b that establish communication between the differential-side upper storage portion 131b and the breather chamber 137.

Figure 20:
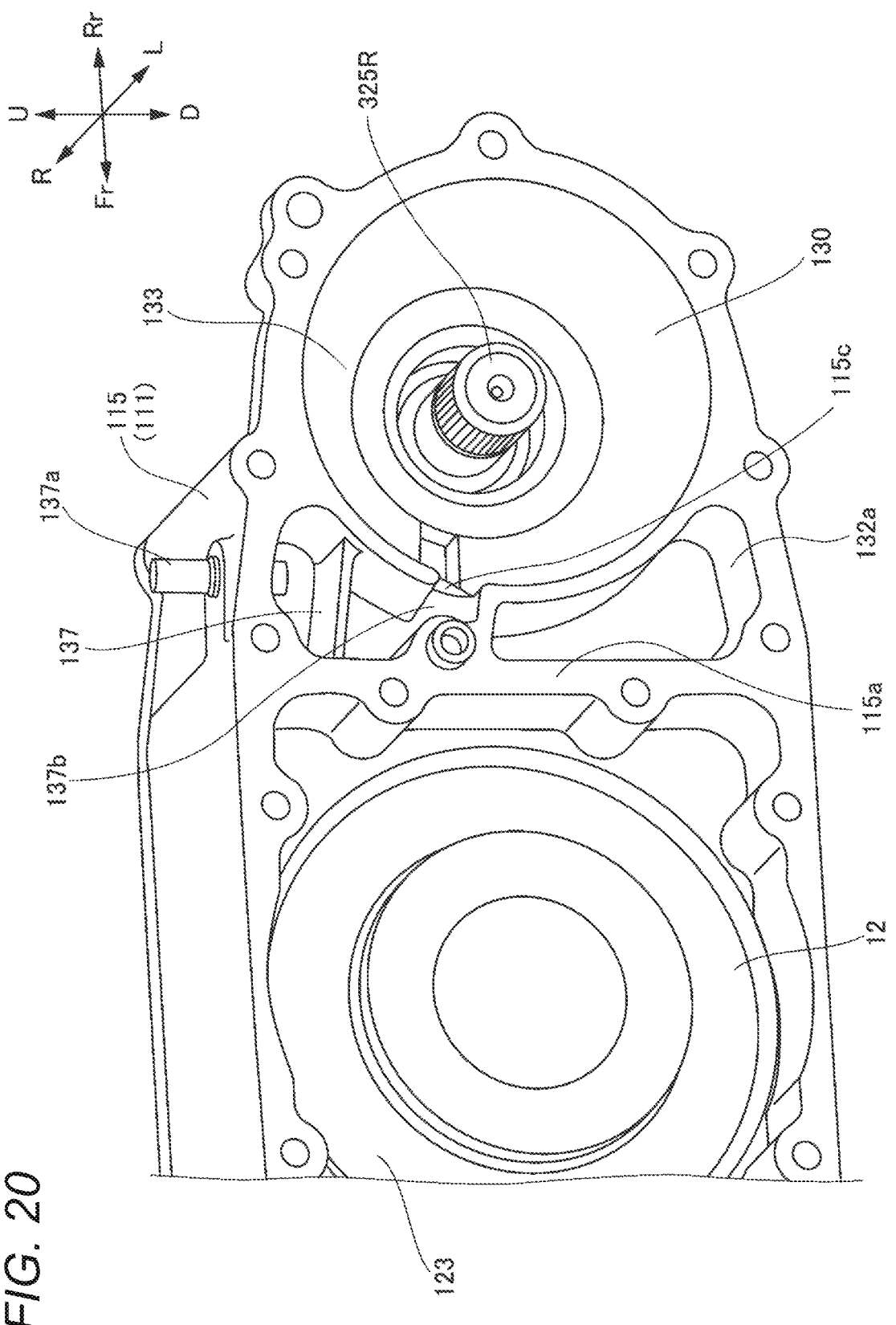
FIG. 20 is a perspective view of the right main case of the drive unit in FIG. 2.

As shown in FIG. 20, an upper portion of the breather chamber 137 is provided with a breather hole 137a communicating with the outside of the drive unit case 11. When a pressure in the gear chamber 13 exceeds a predetermined pressure, gas is released from the breather hole 137a, and the pressure in the gear chamber 13 is maintained at the predetermined pressure or lower.

In a flow direction of the lubricating oil R3 in the drive unit case 11, the breather chamber 137 and the breather hole 137a are provided after passing through the planetary-side upper storage portion 131a and the differential-side upper storage portion 131b for storing the lubricating oil R3. Accordingly, the breather chamber 137 and the breather hole 137a can be formed at a deep portion of the drive unit case 11, and thus contamination such as external dirt or water can be prevented from being mixed into the lubricating oil R3. Further, since the breather chamber 137 and the breather hole 137a can be formed at positions far from heat sources such as the drive motor 20 and the deceleration device 30, the lubricating oil R3 can be prevented from being thermally expanded and blown out of the drive unit case 11.

Figure 21:
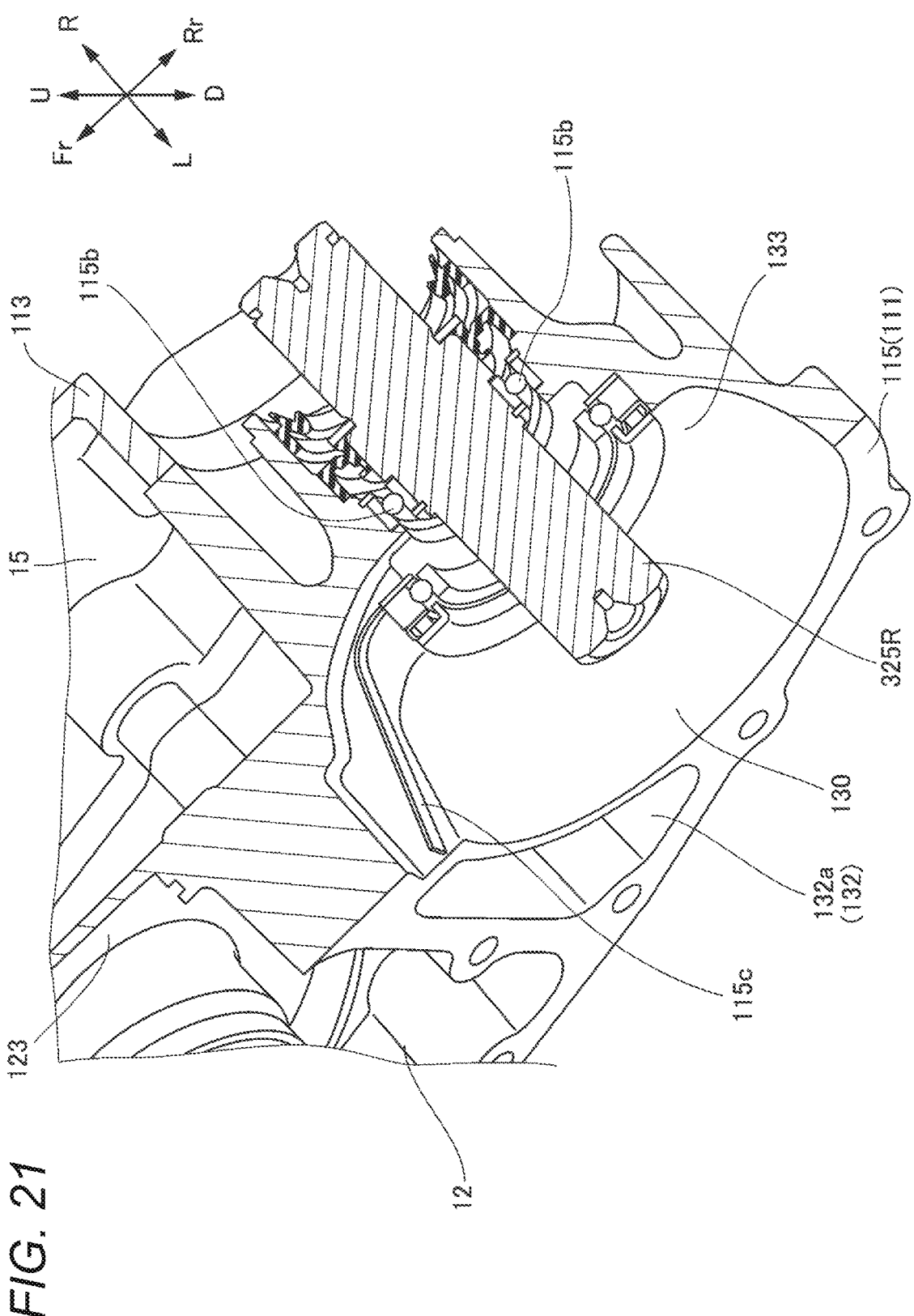
FIG. 21 is a perspective view in which a part of the right main case and a right side cover of the drive unit in FIG. 2 is cut in the left-right direction.

As shown in FIGS. 20 and 21, the drive unit case 11 (the right main case 115 in the present embodiment) is provided with a right drive shaft bearing 115b that pivotally supports the right drive shaft 325R.

A bottom portion of the breather chamber 137 is provided with a breather drain hole 137b for discharging, from the breather chamber 137, the lubricating oil R3 that enters the breather chamber 137 from the differential-side upper storage portion 131b through the oil flow hole 136a, and the lubricating oil R3 that enters the breather chamber 137 from the differential-side upper storage portion 131b through the communication hole 136b and is condensed into a liquid in the breather chamber 137 and stored in a lower portion of the breather chamber 137. The breather drain hole 137b establishes communication between the breather chamber 137 and the accommodation chamber 130, and the drive unit case 11 (the right main case 115 in the present embodiment) is formed with an oil guide portion 115c for guiding, to the right drive shaft bearing 115b, the lubricating oil R3 that flows out from the breather drain hole 137b to the accommodation chamber 130.

Accordingly, since the lubricating oil R3 condensed into the liquid in the breather chamber 137 and stored in the lower portion of the breather chamber 137 is discharged from the breather drain hole 137b, and the right drive shaft bearing 115b can be lubricated by the lubricating oil R3 discharged from the breather drain hole 137b, the right drive shaft bearing 115b can be lubricated efficiently using the lubricating oil R3 stored in the lower portion of the breather chamber 137.

The lubricating oil R3 condensed into the liquid in the breather chamber 137 and stored in the lower portion of the breather chamber 137 can be discharged from the breather chamber 137 and returned to the accommodation chamber 130.

In the present embodiment, the oil guide portion 115c has a gutter shape extending from the right main case 115, and is formed integrally with the right main case 115 by casting. An opening surface of the oil guide portion 115c is covered by a plate-shaped side surface member.

Accordingly, the oil guide portion 115c can be formed at low cost.

Referring back to FIGS. 15 to 19, the planetary-side lower storage chamber 132b is provided adjacent to the left side of the differential-side lower storage chamber 132a. In the left main case 114, the differential-side lower storage chamber 132a and the planetary-side lower storage chamber 132b are adjacent in the left-right direction with a lower partition wall 114e interposed therebetween. That is, the lower partition wall 114e forms a left wall of the differential-side lower storage chamber 132a and a right wall of the planetary-side lower storage chamber 132b. The lower partition wall 114e is provided with a third oil flow hole 134c that establishes communication between the differential-side lower storage chamber 132a and the planetary-side lower storage chamber 132b and through which the lubricating oil R3 flows.

As described above, in the lower portion of the gear chamber 13, since the lower space 132 is partitioned into a separate chamber from the accommodation chamber 130, the planetary-side lower storage chamber 132b is also a separate chamber from the accommodation chamber 130, and thus the lubricating oil R3 that flows into the differential-side lower storage chamber 132a does not flow into the accommodation chamber 130, but flows through the third oil flow hole 134c into the planetary-side lower storage chamber 132b that is a separate chamber from the accommodation chamber 130.

Accordingly, the height of the liquid surface of the lubricating oil R3 stored in the accommodation chamber 130 can be maintained at a lower level, and thus the agitation resistance of the lubricating oil R3 when the deceleration device 30 rotates can be further reduced.

Since the lubricating oil R3 flows from the differential-side lower storage chamber 132a to the planetary-side lower storage chamber 132b through the third oil flow hole 134c, by setting a diameter of the third oil flow hole 134c to be small, a movement speed of the lubricating oil R3 from the differential-side lower storage chamber 132a to the planetary-side lower storage chamber 132b can be reduced. Accordingly, a movement time for the lubricating oil R3 to move from the differential-side lower storage chamber 132a to the planetary-side lower storage chamber 132b can be longer, thus air bubbles in the lubricating oil R3 can be further eliminated, and the temperature of the lubricating oil R3 can be reduced.

In the left main case 114, above the third oil flow hole 134c, the lower partition wall 114e is provided with a second vent hole 135b that establishes communication between the differential-side lower storage chamber 132a and the planetary-side lower storage chamber 132b and through which gas in the differential-side lower storage chamber 132a and the planetary-side lower storage chamber 132b flows.

Accordingly, a pressure in the differential-side lower storage chamber 132a and the planetary-side lower storage chamber 132b is prevented from increasing due to the gas in the differential-side lower storage chamber 132a and the planetary-side lower storage chamber 132b, and thus the lubricating oil R3 stored in the differential-side lower storage chamber 132a can be prevented from becoming difficult to flow into the planetary-side lower storage chamber 132b.

Further, a height of a bottom surface 132*a*1 of the differential-side lower storage chamber 132*a* is higher than a height of a bottom surface 132*b*1 of the planetary-side lower storage chamber 132*b*.

Accordingly, the lubricating oil R3 stored in the differential-side lower storage chamber 132*a* can easily flow to the planetary-side lower storage chamber 132*b*.

At least a part of a left wall of the planetary-side lower storage chamber 132*b* is formed by the baffle plate 116 described above. Therefore, the planetary-side lower storage chamber 132*b* and the chain chamber 14 are partitioned by the baffle plate 116.

Accordingly, it is possible to form the planetary-side lower storage chamber 132*b* at low cost while limiting an increase in weight.

The baffle plate 116 is provided with an oil discharge hole 116*b* that establishes communication between the planetary-side lower storage chamber 132*b* and the chain chamber 14 and through which the lubricating oil R3 flows.

Therefore, the lubricating oil R3 supplied from the chain chamber 14 to the gear chamber 13 through the inside of the input shaft 311 lubricates and cools the deceleration device 30, and then is stored in the accommodation chamber 130, picked up due to the rotation of the deceleration device 30, partially collected by the planetary-side upper storage portion 131*a* and the differential-side upper storage portion 131*b*, flows through the differential-side upper storage portion 131*b*, the differential-side lower storage chamber 132*a*, and the planetary-side lower storage chamber 132*b*, and then returned to the chain chamber 14 through the oil discharge hole 116*b*.

In this way, the oil discharge hole 116*b* for discharging the lubricating oil R3 circulated in the gear chamber 13 from the gear chamber 13 can be easily formed.

Although an embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the constituent elements in the above embodiment may be freely combined without departing from the gist of the invention.

In this specification, at least the following matters are described. In the parentheses, the corresponding constituent elements and the like in the above embodiment are shown as examples, but the present invention is not limited thereto.

(1) A power transmission device (drive unit 10) including:
a deceleration device (deceleration device 30); and
a case (drive unit case 11) including a gear chamber (gear chamber 13) provided with an accommodation chamber (accommodation chamber 130) that accommodates the deceleration device therein, in which
the deceleration device includes
an input shaft (input shaft 311) whose rotation axis direction extends in a horizontal direction, and
a deceleration mechanism (planetary gear mechanism 31) configured to reduce power input from the input shaft, and
a wall portion (second partition wall 114*b*) of the case is provided with a first storage portion (planetary-side upper storage portion 131*a*) configured to store a lubricating liquid (lubricating oil R3) for lubricating the deceleration device, the first storage portion being arranged above a rotation axis of the input shaft and below an upper end of the deceleration mechanism in an upper-lower direction, and arranged at a position where at least a part thereof overlaps the deceleration mechanism in an axial direction of the input shaft.

According to (1), by storing the lubricating liquid in the first storage portion, a height of a liquid surface of the lubricating liquid stored in a lower portion of the accommodation chamber can be lowered, and thus agitation resistance of the lubricating liquid caused by rotation of the deceleration device can be further reduced. In this way, a dimension in a height direction of the power transmission device can be reduced without lowering power transmission efficiency.

(2) The power transmission device according to (1), in which
the lubricating liquid is stored in a lower portion of the accommodation chamber,
a lower portion of the deceleration mechanism is immersed in the lubricating liquid stored in the lower portion of the accommodation chamber, and
a part of the lubricating liquid stored in the lower portion of the accommodation chamber is picked up by the deceleration mechanism and stored in the first storage portion.

According to (2), by collecting the lubricating liquid picked up by the deceleration mechanism and scattered in the first storage portion, the height of the liquid surface of the lubricating liquid stored in the lower portion of the accommodation chamber can be further lowered, and thus the agitation resistance of the lubricating liquid caused by rotation of the deceleration device can be further reduced.

(3) The power transmission device according to (1), in which
the input shaft is a hollow shaft provided with a plurality of lubricating liquid supply holes (oil supply holes 311*b*) aligned along the axial direction, the plurality of lubricating liquid supply holes penetrating the input shaft in a radial direction thereof,
the lubricating liquid is supplied from outside of the gear chamber to the gear chamber via the plurality of lubricating liquid supply holes through inside of the input shaft, and
a part of the lubricating liquid scattered from the plurality of lubricating liquid supply holes is stored in the first storage portion.

According to (3), by collecting the lubricating liquid scattered from the lubricating liquid supply holes of the input shaft in the first storage portion, the height of the liquid surface of the lubricating liquid stored in the lower portion of the accommodation chamber can be further reduced, and thus the agitation resistance of the lubricating liquid caused by rotation of the deceleration device can be further reduced.

(4) The power transmission device according to (1), in which
the first storage portion is formed in one piece with the case by casting.

According to (4), the first storage portion can be formed at low cost.

(5) The power transmission device according to (1), in which
the deceleration mechanism includes a planetary gear mechanism.

According to (5), by using the planetary gear mechanism in the deceleration mechanism, it is possible to obtain a desired reduction ratio while limiting an increase in a dimension in the radial direction relative to the rotation axis direction.

(6) A power transmission device (drive unit 10) including:
a differential gear mechanism (differential gear mechanism 32); and
a case (drive unit case 11) including a gear chamber (gear chamber 13) provided with an accommodation chamber (accommodation chamber 130) that accommodates the differential gear mechanism therein, in which
the differential gear mechanism includes
a differential case (differential case 321) whose rotation axis direction extends in a horizontal direction, and
a wall portion (second partition wall 114b) of the case is provided with a second storage portion (differential-side upper storage portion 131b) configured to store a lubricating liquid (lubricating oil R3) for lubricating the differential gear mechanism, the second storage portion being arranged above a rotation axis of the differential case and below an upper end of the differential case in an upper-lower direction, and arranged at a position where at least a part thereof overlaps the differential gear mechanism in an axial direction of the differential case.

According to (6), by storing the lubricating liquid in the second storage portion, the height of the liquid surface of the lubricating liquid stored in the lower portion of the accommodation chamber can be lowered, and the agitation resistance of the lubricating liquid caused by rotation of the differential gear mechanism can be further reduced. In this way, a dimension in a height direction of the power transmission device can be reduced without lowering power transmission efficiency.

(7) The power transmission device according to (1), in which
the deceleration device includes a differential gear mechanism (differential gear mechanism 32) including a differential case (differential case 321) whose rotation axis direction extends in the horizontal direction, and
the wall portion (second partition wall 114b) of the case is provided with a second storage portion (differential-side upper storage portion 131b) configured to store the lubricating liquid, the second storage portion being arranged above a rotation axis of the differential case and below an upper end of the differential case in the upper-lower direction, and arranged at a position where at least a part thereof overlaps the differential gear mechanism in an axial direction of the differential case.

According to (7), by storing the lubricating liquid in the second storage portion, the height of the liquid surface of the lubricating liquid stored in the lower portion of the accommodation chamber can be lowered, and thus the agitation resistance of the lubricating liquid caused by rotation of the differential gear mechanism can be further reduced. In this way, the dimension in the height direction of the power transmission device can be reduced without lowering power transmission efficiency.

(8) The power transmission device according to (7), in which
an output shaft (left drive shaft 325L, right drive shaft 325R) of the differential gear mechanism is disposed coaxially with the input shaft.

According to (8), the input shaft and the output shaft of the differential gear mechanism are coaxially disposed, and thus the power transmission device can be further downsized.

(9) The power transmission device according to (7), in which
the deceleration mechanism includes a planetary gear mechanism, the planetary gear mechanism includes a sun gear (sun gear 312), a plurality of planetary gears (stepped pinions 314), a planetary carrier (planetary carrier 316), and a ring gear (ring gear 317),
power input from the input shaft to the planetary gear mechanism is output from the planetary carrier, and
the planetary carrier and the differential case are formed in one piece with each other.

According to (9), since the planetary carrier and the differential case are formed in one piece, the planetary gear mechanism and the differential gear mechanism can be integrated, and the deceleration device can be further downsized.

(10) The power transmission device according to any one of (6) to (9), in which
the lubricating liquid is stored in a lower portion of the accommodation chamber,
a lower portion of the differential gear mechanism is immersed in the lubricating liquid stored in the lower portion of the accommodation chamber, and
a part of the lubricating liquid stored in the lower portion of the accommodation chamber is picked up by the differential gear mechanism and stored in the second storage portion.

According to (10), by collecting the lubricating liquid picked up by the differential gear mechanism and scattered in the second storage portion, the height of the liquid surface of the lubricating liquid stored in the lower portion of the accommodation chamber can be further lowered, and thus the agitation resistance of the lubricating liquid caused by rotation of the deceleration device can be further reduced.

(11) The power transmission device according to (7), in which
the first storage portion and the second storage portion are adjacent to each other across a first partition wall (upper partition wall 114d), and
the first partition wall is provided with a first flow hole (first oil flow hole 134a) communicating the first storage portion with the second storage portion and configured to allow the lubricating liquid to flow.

According to (11), the lubricating liquid stored in the first storage portion can flow to the second storage portion.

(12) The power transmission device according to (11), in which
the first partition wall is provided with a first vent hole (first vent hole 135a) above the first flow hole, the first vent hole communicating the first storage portion with the second storage portion and being configured to allow gas in the first storage portion and the second storage portion to flow.

According to (12), the first vent hole prevents a pressure in the first storage portion and the second storage portion from increasing due to the gas in the first storage portion and the second storage portion, thereby preventing the lubricating liquid stored in the first storage portion from becoming difficult to flow into the second storage portion.

(13) The power transmission device according to (11), in which
a height of a bottom surface (bottom surface 131a1) of the first storage portion is higher than a height of a bottom surface (bottom surface 131b1) of the second storage portion.

According to (13), since the height of the bottom surface of the first storage portion is higher than the height of the bottom surface of the second storage portion, the lubricating liquid stored in the first storage portion can easily flow to the second storage portion.

(14) The power transmission device according to (6) or (7), in which the gear chamber is provided with a third storage portion (differential-side lower storage chamber 132*a*) below the second storage portion, the third storage portion being partitioned into a separate chamber from the accommodation chamber, the second storage portion and the third storage portion are adjacent to each other in the upper-lower direction across a second partition wall (upper-lower partition wall 114*c*), and the second partition wall is provided with a second flow hole (second oil flow hole 134*b*) communicating the second storage portion with the third storage portion and configured to allow the lubricating liquid to flow.

According to (14), the lubricating liquid stored in the second storage portion does not flow to the accommodation chamber, but flows through the second flow hole to the third storage portion that is a separate chamber from the accommodation chamber. Accordingly, the height of the liquid surface of the lubricating liquid stored in the accommodation chamber can be maintained at a lower level, and thus the agitation resistance of the lubricating liquid when the deceleration device rotates can be further reduced.

(15) The power transmission device according to (6) or (7), in which the case is divided into a first case (left main case 114) and a second case (right main case 115), the first case and the second case are assembled with a gasket (gasket 136) interposed therebetween, and a wall portion of the second storage portion is formed by the first case and the gasket.

According to (15), the wall portion of the second storage portion can be formed at low cost while limiting an increase in weight.

(16) The power transmission device according to (15), in which the gear chamber is provided with a breather chamber (breather chamber 137) adjacent to the second storage portion across the gasket, and the gasket is provided with a lubricating liquid flow hole (oil flow hole 136*a*) communicating the second storage portion with the breather chamber and configured to allow at least a part of the lubricating liquid stored in the second storage portion to pass, and a communication hole (communication hole 136*b*) configured to allow gas and mist of the lubricating liquid in the second storage portion and the breather chamber to flow.

According to (16), the lubricating liquid flow hole and the communication hole that establish communication between the second storage portion and the breather chamber can be easily formed.

(17) The power transmission device according to (16), in which a wall portion of the breather chamber is formed by the second case and the gasket.

According to (17), the breather chamber can be formed at low cost while limiting an increase in weight.

(18) The power transmission device according to (16), in which an upper portion of the breather chamber is provided with a breather hole (breather hole 137*a*) communicating with outside of the case.

According to (18), in a flow direction of the lubricating liquid in the drive unit case, the breather chamber and the breather hole are provided after passing through the first storage portion and the second storage portion in which the lubricating liquid is stored. Accordingly, the breather chamber and the breather hole can be formed at a deep portion of the drive unit case, and thus contamination such as external dirt or water can be prevented from being mixed into the lubricating liquid. Further, since the breather chamber and the breather hole can be formed at positions far from a heat source such as the deceleration device, the lubricating liquid can be prevented from being thermally expanded and blown out of the drive unit case.

(19) The power transmission device according to (17), in which a bottom portion of the breather chamber is provided with a breather drain hole (breather drain hole 137*b*) communicating with the accommodation chamber.

According to (19), the lubricating liquid condensed into a liquid in the breather chamber and stored in a lower portion of the breather chamber can be discharged from the breather chamber and returned to the accommodation chamber.

(20) The power transmission device according to (19), in which the second case is provided with an output shaft bearing (right drive shaft bearing 115*b*) pivotally supporting an output shaft (right drive shaft 325R) of the differential gear mechanism, and a guide portion (oil guide portion 115*c*) configured to guide, to the output shaft bearing, the lubricating liquid flowing out from the breather drain hole to the accommodation chamber.

According to (20), the output shaft bearing can be lubricated by the lubricating liquid discharged from the breather drain hole, and thus the output shaft bearing can be efficiently lubricated using the lubricating liquid stored in the lower portion of the breather chamber.

(21) The power transmission device according to (20), in which the guide portion has a gutter shape extending from the second case, and is formed in one piece with the second case by casting.

According to (21), the guide portion can be formed at low cost.

(22) The power transmission device according to (14), in which the gear chamber is provided with a fourth storage portion (planetary-side lower storage chamber 132*b*) adjacent to the third storage portion across a third partition wall (lower partition wall 114*e*), the fourth storage portion being partitioned into a separate chamber from the accommodation chamber, and the third partition wall is provided with a third flow hole (third oil flow hole 134*c*) communicating the third storage portion with the fourth storage portion and configured to allow the lubricating liquid to flow.

According to (22), the lubricating liquid stored in the second storage portion does not flow to the accommodation chamber, but flows through the second flow hole to the third storage portion that is a separate chamber from the accommodation chamber. Accordingly, the height of the liquid surface of the lubricating liquid stored in the accommodation chamber can be maintained at a lower level, and thus the agitation resistance of the lubricating liquid when the deceleration device rotates can be further reduced.

Since the lubricating liquid flows from the third storage portion to the fourth storage portion through the third flow hole, a movement speed of the lubricating liquid from the third storage portion to the fourth storage portion can be reduced by setting a diameter of the third flow hole to be small. Accordingly, a movement time for the lubricating liquid to move from the third storage portion to the fourth storage portion can be longer, thus air bubbles in the lubricating liquid can be further eliminated, and a temperature of the lubricating liquid can be reduced.

(23) The power transmission device according to (22), in which the third partition wall is provided with a second vent hole (second vent hole 135*b*) above the third flow hole, the second vent hole communicating the third storage portion with the fourth storage portion and being configured to allow gas in the third storage portion and the fourth storage portion to flow.

According to (23), the second vent hole prevents a pressure in the third storage portion and the fourth storage portion from increasing due to the gas in the third storage portion and the fourth storage portion, thereby preventing the lubricating liquid stored in the third storage portion from becoming difficult to flow into the fourth storage portion.

(24) The power transmission device according to (22), in which a height of a bottom surface (bottom surface 132*a*1) of the third storage portion is higher than a height of a bottom surface (bottom surface 132*b*1) of the fourth storage portion.

According to (24), since the height of the bottom surface of the third storage portion is higher than the height of the bottom surface of the fourth storage portion, the lubricating liquid stored in the third storage portion can easily flow to the fourth storage portion.

(25) The power transmission device according to (22), in which the case is provided with a baffle plate (baffle plate 116) that partitions the gear chamber from outside of the gear chamber, and at least a part of a wall portion of the fourth storage portion is formed by the baffle plate.

According to (25), the fourth storage portion can be formed at low cost while limiting an increase in weight.

(26) The power transmission device according to (25), in which the baffle plate is provided with a discharge hole (oil discharge hole 116*b*) communicating the fourth storage portion with the outside of the gear chamber and configured to allow the lubricating liquid to flow.

According to (26), it is possible to easily form the discharge hole for discharging the lubricating liquid circulating in the gear chamber from the gear chamber.

(27) The power transmission device according to (25), further including:

an input shaft (input shaft 311) whose rotation axis direction extends in the horizontal direction, in which the baffle plate is a plate-shaped member that partitions the gear chamber from the outside of the gear chamber, and has a circular opening (opening 116*a*) at a center thereof, and the input shaft is inserted into the opening.

According to (27), since the baffle plate extends toward a radial direction outer side around the input shaft, it is possible to limit the lubricating liquid scattering in the gear chamber from scattering to the outside of the gear chamber due to rotation of the input shaft.

What is claimed is:
1. A power transmission device comprising:
a deceleration device; and a case including a gear chamber provided with an accommodation chamber that accommodates the deceleration device therein, wherein the deceleration device includes
an input shaft whose rotation axis direction extends in a horizontal direction, and
a deceleration mechanism configured to reduce power input from the input shaft,
a wall portion of the case is provided with a first storage portion configured to store a lubricating liquid for lubricating the deceleration device, the first storage portion being arranged above a rotation axis of the input shaft and below an upper end of the deceleration mechanism in an upper-lower direction, and arranged at a position where at least a part thereof overlaps the deceleration mechanism in an axial direction of the input shaft,
the deceleration mechanism includes a planetary gear mechanism,
the lubricating liquid is stored in a lower portion of the accommodation chamber,
a lower portion of the planetary gear mechanism is immersed in the lubricating liquid stored in the lower portion of the accommodation chamber, and
a part of the lubricating liquid stored in the lower portion of the accommodation chamber is picked up by the planetary gear mechanism and stored in the first storage portion.

2. The power transmission device according to claim 1, wherein the input shaft is a hollow shaft provided with at least one lubricating liquid supply hole aligned along the axial direction, the at least one lubricating liquid supply hole penetrating the input shaft in a radial direction thereof, the lubricating liquid is supplied from outside of the gear chamber to the gear chamber via the at least one lubricating liquid supply hole through inside of the input shaft, and a part of the lubricating liquid scattered from the at least one lubricating liquid supply hole is stored in the first storage portion.

3. The power transmission device according to claim 1, wherein the first storage portion is formed in one piece with the case by casting.

4. The power transmission device according to claim 1, wherein the deceleration device includes a differential gear mechanism including a differential case whose rotation axis direction extends in the horizontal direction, and the wall portion of the case is provided with a second storage portion configured to store a lubricating liquid for lubricating the differential gear mechanism, the second storage portion being arranged above a rotation axis of the differential case and below an upper end of the differential case in the upper-lower direction, and arranged at a position where at least a part thereof overlaps the differential gear mechanism in an axial direction of the differential case.

5. The power transmission device according to claim 4, wherein an output shaft of the differential gear mechanism is disposed coaxially with the input shaft.

6. The power transmission device according to claim 4, wherein the planetary gear mechanism includes a sun gear, a plurality of planetary gears, a planetary carrier, and a ring gear, power input from the input shaft to the planetary gear mechanism is output from the planetary carrier, and the planetary carrier and the differential case are formed in one piece with each other.

7. The power transmission device according to claim 4, wherein the first storage portion and the second storage portion are adjacent to each other across a first partition wall, and the first partition wall is provided with a first flow hole communicating the first storage portion with the second storage portion and configured to allow the lubricating liquid to flow.

8. The power transmission device according to claim 7, wherein the first partition wall is provided with a first vent hole above the first flow hole, the first vent hole communicating the first storage portion with the second storage portion and being configured to allow gas in the first storage portion and the second storage portion to flow.

9. The power transmission device according to claim 7, wherein a height of a bottom surface of the first storage portion is higher than a height of a bottom surface of the second storage portion.

10. A power transmission device comprising:

a differential gear mechanism; and a case including a gear chamber provided with an accommodation chamber that accommodates the differential gear mechanism therein, wherein the differential gear mechanism includes a differential case whose rotation axis direction extends in a horizontal direction, a wall portion of the case is provided with a second storage portion configured to store a lubricating liquid for lubricating the differential gear mechanism, the second storage portion being arranged above a rotation axis of the differential case and below an upper end of the differential case in an upper-lower direction, and arranged at a position where at least a part thereof overlaps the differential gear mechanism in an axial direction of the differential case, the gear chamber is provided with a third storage portion below the second storage portion, the third storage portion being partitioned into a separate chamber from the accommodation chamber, the second storage portion and the third storage portion are adjacent to each other in the upper-lower direction across a second partition wall, and the second partition wall is provided with a second flow hole communicating the second storage portion with the third storage portion and configured to allow the lubricating liquid to flow.

11. The power transmission device according to claim 10, wherein the lubricating liquid is stored in a lower portion of the accommodation chamber, a lower portion of the differential gear mechanism is immersed in the lubricating liquid stored in the lower portion of the accommodation chamber, and a part of the lubricating liquid stored in the lower portion of the accommodation chamber is picked up by the differential gear mechanism and stored in the second storage portion.

12. The power transmission device according to claim 10, wherein the case is divided into a first case and a second case, the first case and the second case are assembled with a gasket interposed therebetween, and a wall portion of the second storage portion is formed by the first case and the gasket.

13. The power transmission device according to claim 12, wherein the gear chamber is provided with a breather chamber adjacent to the second storage portion across the gasket, and the gasket is provided with:

a lubricating liquid flow hole communicating the second storage portion with the breather chamber and configured to allow at least a part of the lubricating liquid stored in the second storage portion to pass; and a communication hole configured to allow gas and mist of the lubricating liquid in the second storage portion and the breather chamber to flow.

14. The power transmission device according to claim 13, wherein an upper portion of the breather chamber is provided with a breather hole communicating with outside of the case.

15. The power transmission device according to claim 13, wherein a wall portion of the breather chamber is formed by the second case and the gasket.

16. The power transmission device according to claim 15, wherein a bottom portion of the breather chamber is provided with a breather drain hole communicating with the accommodation chamber.

17. The power transmission device according to claim 16, wherein the second case is provided with:

an output shaft bearing pivotally supporting an output shaft of the differential gear mechanism; and a guide portion configured to guide, to the output shaft bearing, the lubricating liquid flowing out from the breather drain hole to the accommodation chamber.

18. The power transmission device according to claim 17, wherein the guide portion has a gutter shape extending from the second case, and is formed in one piece with the second case by casting.

19. The power transmission device according to claim 10, wherein the gear chamber is provided with a fourth storage portion adjacent to the third storage portion across a third partition wall, the fourth storage portion being partitioned into a separate chamber from the accommodation chamber, and the third partition wall is provided with a third flow hole communicating the third storage portion with the fourth storage portion and configured to allow the lubricating liquid to flow.

20. The power transmission device according to claim 19, wherein the third partition wall is provided with a second vent hole above the third flow hole, the second vent hole communicating the third storage portion with the fourth storage portion and being configured to allow gas in the third storage portion and the fourth storage portion to flow.

21. The power transmission device according to claim 19, wherein a height of a bottom surface of the third storage portion is higher than a height of a bottom surface of the fourth storage portion.

22. The power transmission device according to claim 19, wherein the case is provided with a baffle plate that partitions the gear chamber from outside of the gear chamber, and at least a part of a wall portion of the fourth storage portion is formed by the baffle plate.

23. The power transmission device according to claim 22, wherein the baffle plate is provided with a discharge hole communicating the fourth storage portion with the outside of the gear chamber and configured to allow the lubricating liquid to flow.

24. The power transmission device according to claim 22, further comprising:

an input shaft whose rotation axis direction extends in the horizontal direction, wherein the baffle plate is a plate-shaped member that partitions the gear chamber from the outside of the gear chamber, and has a circular opening at a center thereof, and the input shaft is inserted into the opening.

\* \* \* \* \*